US008561974B2

(12) United States Patent
Steele et al.

(10) Patent No.: US 8,561,974 B2
(45) Date of Patent: Oct. 22, 2013

(54) PIN CLAMP ASSEMBLY

(75) Inventors: Kenneth A. Steele, Fort Wayne, IN (US); Bruce D. McIntosh, Monroeville, IN (US); Steven M. Moilanen, Fort Wayne, IN (US); William E. Davenport, Fort Wayne, IN (US); William D. Givens, Berne, IN (US); Parag Patwardhan, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 1289 days.

(21) Appl. No.: 12/267,788

(22) Filed: Nov. 10, 2008

(65) Prior Publication Data

US 2009/0096146 A1 Apr. 16, 2009

Related U.S. Application Data

(63) Continuation of application No. 11/302,840, filed on Dec. 14, 2005, now Pat. No. 7,448,607.

(60) Provisional application No. 60/636,304, filed on Dec. 15, 2004.

(51) Int. Cl.
*B23Q 3/08* (2006.01)
*B23Q 1/00* (2006.01)

(52) U.S. Cl.
USPC .................................. 269/32; 269/24; 269/49

(58) Field of Classification Search
USPC ................................. 269/32, 24, 49; 294/203
See application file for complete search history.

(56) References Cited

U.S. PATENT DOCUMENTS

| | | | | |
|---|---|---|---|---|
| 6,056,281 | A * | 5/2000 | Moilanen et al. | 269/32 |
| 6,102,383 | A * | 8/2000 | Tunkers | 269/24 |
| 6,276,733 | B1 * | 8/2001 | Moilanen et al. | 294/203 |
| 6,439,560 | B2 * | 8/2002 | Sawada et al. | 269/32 |
| 6,698,736 | B2 * | 3/2004 | Dugas et al. | 269/32 |
| 6,786,478 | B2 * | 9/2004 | Pavlik et al. | 269/49 |
| 6,902,159 | B2 * | 6/2005 | Sawdon et al. | 269/32 |
| 6,902,160 | B1 * | 6/2005 | Zajac et al. | 269/49 |
| 6,913,254 | B2 * | 7/2005 | Pavlik et al. | 269/49 |
| 7,108,255 | B2 * | 9/2006 | Zajac et al. | 269/32 |
| 7,311,301 | B2 * | 12/2007 | Liu et al. | 269/32 |
| 7,448,607 | B2 * | 11/2008 | Steele et al. | 269/32 |
| 7,467,788 | B2 * | 12/2008 | McIntosh et al. | 269/32 |
| 7,516,948 | B2 * | 4/2009 | McIntosh et al. | 269/32 |
| 7,815,176 | B2 * | 10/2010 | McIntosh et al. | 269/32 |
| 8,132,798 | B2 | 3/2012 | McIntosh et al. | |
| 8,132,799 | B2 | 3/2012 | McIntosh et al. | |
| 2002/0093131 | A1 * | 7/2002 | Dugas et al. | 269/32 |
| 2002/0135116 | A1 * | 9/2002 | Dugas et al. | 269/49 |
| 2004/0041323 | A1 * | 3/2004 | Migliori | 269/32 |
| 2005/0225017 | A1 * | 10/2005 | Sakamoto | 269/32 |

(Continued)

*Primary Examiner* — Lee D Wilson
*Assistant Examiner* — Alvin Grant
(74) *Attorney, Agent, or Firm* — Taylor IP, P.C.

(57) ABSTRACT

A pin clamp assembly having a housing, locating pin, at least one finger, a drive rod and an actuator is provided. At least a portion of the locating pin may be extendable exterior of the housing. The finger is located adjacent the locating pin and movable relative thereto. The drive rod is movable and is engagable with the finger to move the finger between clamped and unclamped positions. The actuator drives the locating pin and the drive rod. Movement of the locating pin and drive rod is linear only and no rotational movement of the locating pin and drive rod is employed to move the finger between clamped and unclamped positions.

4 Claims, 17 Drawing Sheets

(56) References Cited

U.S. PATENT DOCUMENTS

| | | | | |
|---|---|---|---|---|
| 2007/0042632 | A1 | 2/2007 | Patwardhan et al. | |
| 2007/0267795 | A1 | 11/2007 | Patwardhan et al. | |
| 2008/0315477 | A1 * | 12/2008 | Alexander et al. | 269/32 |
| 2008/0315478 | A1 | 12/2008 | McIntosh | |
| 2009/0096146 | A1 | 4/2009 | Steele et al. | |
| 2009/0121403 | A1 * | 5/2009 | McIntosh et al. | 269/32 |
| 2009/0236785 | A1 * | 9/2009 | McIntosh et al. | 269/32 |
| 2009/0315236 | A1 | 12/2009 | McIntosh | |

* cited by examiner

DETAIL A

DETAIL B

SECTION A-A

SECTION B-B

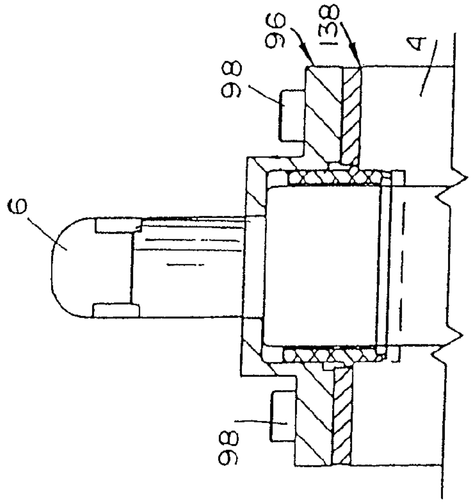
FIG. 10c
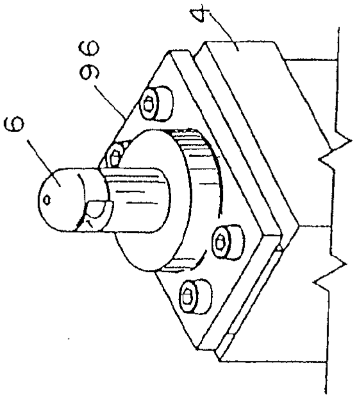
FIG. 10b
FIG. 10a
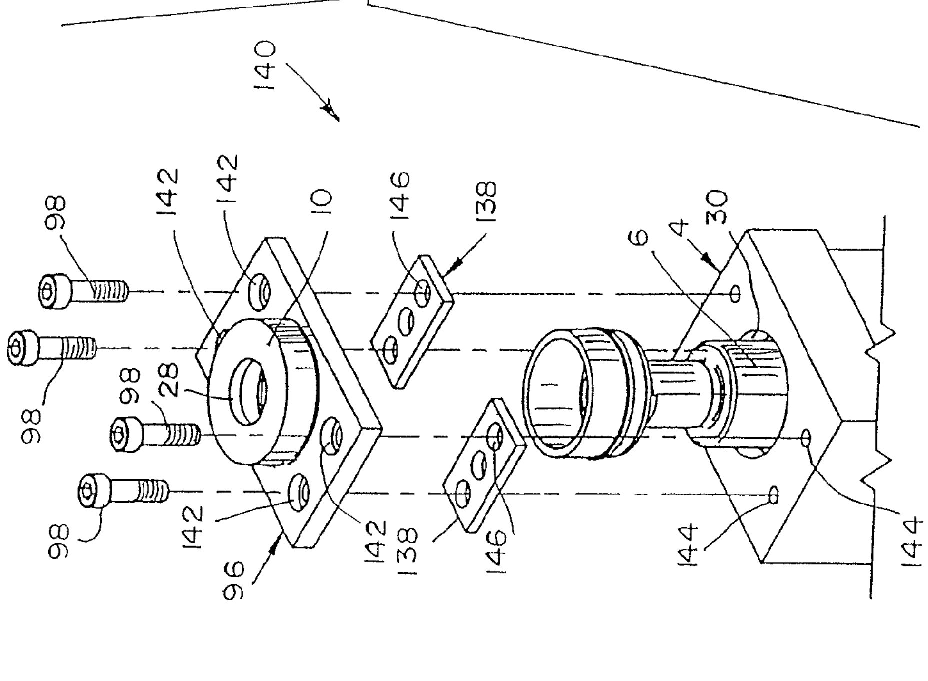

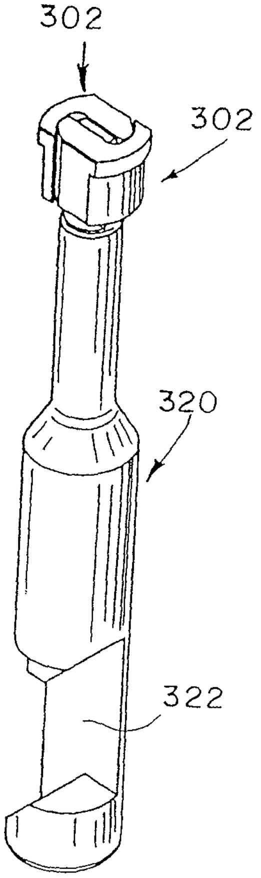
FIG. 19a
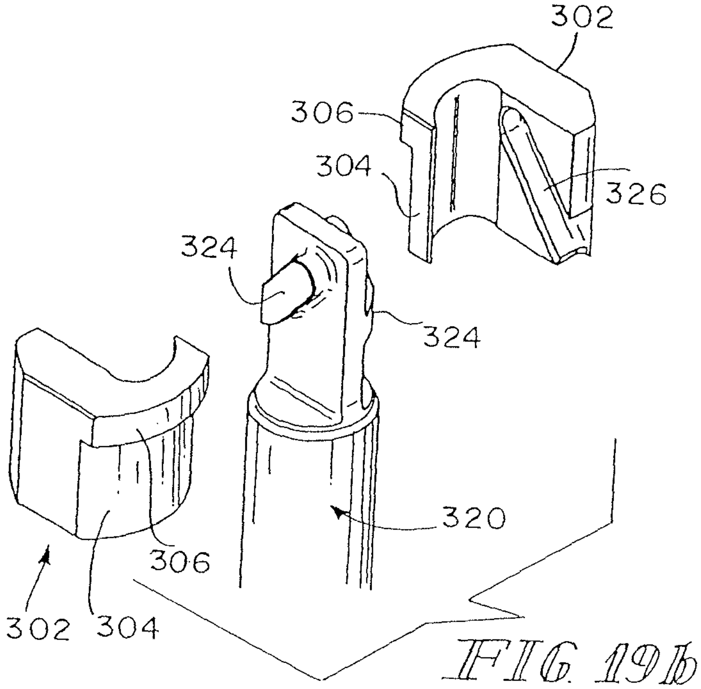
FIG. 19b
FIG. 19c
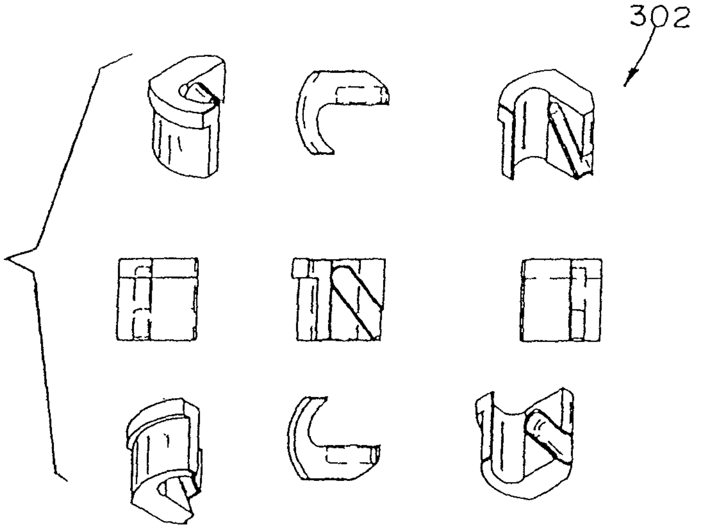

PIN CLAMP ASSEMBLY

RELATED APPLICATIONS

The present application is related to and claims priority to U.S. patent application Ser. No. 11/302,840, entitled Pin Clamp Assembly, filed on Dec. 14, 2005, which claims priority to U.S. Provisional Patent Application Ser. No. 60/636,304, filed on Dec. 15, 2004, entitled Pin Clamp Assembly. The subject matter disclosed in these applications is hereby expressly incorporated into the present application.

TECHNICAL FIELD

The present disclosure is generally related to gripper or clamp assemblies. More particularly, the present disclosure is related to pin clamp assemblies that can selectively grip a workpiece.

BACKGROUND AND SUMMARY

Pin clamps which use locating pins and movable fingers to engage and grip a workpiece are known. Characteristically, such pin clamps employ either a stationary or rectilinearly moving locating pin with a movable finger or fingers positioned therein. Clamps having the rectilinearly movable locating pin extend the locating pin to engage a hole in a workpiece, such as a metal sheet. The locating pin then retracts and the finger or fingers within the locating pin extend and hold the workpiece against the clamp body. Clamps having the stationary locating pin typically include a finger or fingers that move both outwardly and downwardly relative to the locating pin to hold the workpiece against the clamp body. These conventional pin clamps, however, often employ a combination of a linearly and rotationally moving components to hold the workpiece. It may be useful to provide a pin clamp assembly that does not require such rotational movement in certain components yet still hold a workpiece.

Accordingly, an illustrative embodiment of the present disclosure provides a pin clamp assembly which comprises a pin clamp assembly that comprises a housing, locating pin, at least one finger, a drive rod and an actuator. At least a portion of the locating pin is extendable exterior of the housing. The finger is located adjacent the locating pin and movable relative thereto. The drive rod is movable and is engagable with the finger to move the finger between clamped and unclamped positions. The actuator drives the locating pin and the drive rod. Movement of the locating pin and drive rod is linear only and no rotational movement of the locating pin and drive rod is employed to move the finger between clamped and unclamped positions.

In the above and other illustrative embodiments, the pin clamp assembly may further comprise: the locating pin being movable relative to the housing rectilinearly along the longitudinal axis; a driver being movable rectilinearly and laterally with respect to the longitudinal axis; the driver moves linearly to move the drive rod so the drive rod moves independently of the locating pin; a cam member which has a cam slot disposed therein which receives a portion of the driver which restricts movement of the driver; neither the finger nor the drive rod rotates about a central axis to move the finger between clamped and unclamped positions; and the finger moves linearly between clamped and unclamped positions.

Another illustrative embodiment of the present disclosure provides a pin clamp assembly comprising a locating pin with at least one finger extendable there from and that is engagable with a workpiece. The pin clamp assembly further comprises: a means for moving the at least one finger between extended and retracted positions wherein the means moves only rectilinearly, and along with the finger, does not rotate about any axis to move the at least one finger; and an actuation means that moves the means for moving the at least one finger.

Another illustrative embodiment of the present disclosure provides a pin clamp assembly which comprises a locating pin, a drive rod, an actuator, a drive and at least one finger. The locating pin is movable rectilinearly along a longitudinal axis. The drive rod is also movable rectilinearly along the longitudinal axis. The actuator drives the drive rod rectilinearly. The driver is movable rectilinearly and laterally with respect to the longitudinal axis. The finger is located adjacent the locating pin and is engagable with the drive rod. The linear movement of the drive rod moves the driver which moves linearly and moves the drive rod independently of the locating pin to move the finger with respect to the locating pin.

In the above and other illustrative embodiments, the pin clamp assembly may further comprise: a cam member having a cam slot disposed therethrough wherein the driver is engagable with the cam slot, and wherein the cam slot determines the lateral movement of the driver with respect to the longitudinal axis; the drive pin having a slot disposed therein that is oriented transverse to the longitudinal axis, and is configured to receive the driver, and the driver is movable linearly along with and lateral to, the longitudinal axis; the cam slot of the cam member being shaped to move the driver laterally at a point while moving along the longitudinal axis; a portion of the driver being keyed with the slot in the drive rod so the driver will be movable linearly along with and lateral to, the longitudinal axis; the driver being engagable with the drive rod; the driver also moves rectilinearly along the longitudinal axis; the actuator is coupled to the locating pin; the finger being movable between clamping and unclamping positions; the finger being a plurality of fingers; the fingers move laterally with respect to the drive rod; the fingers move laterally with respect to the locating pin; as the locating pin retracts to move the fingers to the clamped position, locating pin extends to move the fingers to the unclamped position; and the finger moves linearly in a plane parallel to a plane in which the drive rod moves.

Another illustrative embodiment of the present disclosure provides a pin clamp assembly which comprises a body, a drive rod, at least one finger, and a driver. The drive rod is movable rectilinearly and non-rotationally within the body. The finger moves linearly and non-rotationally, and is in operable communication with the drive rod. The driver moves linearly and engages the drive rod which acts on the finger to move the finger linearly to a position exterior of the body.

In the above and other illustrative embodiments, the pin clamp assembly may further comprise: a cam member having a cam slot disposed therethrough wherein the driver is engagable with the cam slot, and wherein the cam slot determines the movement of the driver; the drive rod has a slot disposed therein, and is configured to receive the driver, and wherein the driver is linearly movable; the cam slot of the cam member is shaped to move the driver laterally; a portion of the driver is keyed with the slot and extends outward from both ends of the slot; an actuator that moves the drive rod.

Additional features and advantages of the pin clamp assembly will become apparent to those skilled in the art upon consideration of the following detailed description of the illustrated embodiments exemplifying the best mode of carrying out the pin clamp assembly as presently perceived.

BRIEF DESCRIPTION OF DRAWINGS

The present disclosure will be described hereafter with reference to the attached drawings which are given as non-limiting examples only, in which:

FIGS. 10*a-c* are exploded, perspective, and cross-sectional detail views of an illustrative embodiment of a shim and sleeve assembly;

FIGS. 19*a-c* are perspective, perspective-exploded detail, and perspective/top/bottom/side views of the drive rod and alternate finger configuration for use in the pin clamp assembly.

Corresponding reference characters indicate corresponding parts throughout the several views. The exemplification set out herein illustrates embodiments of the pin clamp assembly, and such exemplification is not to be construed as limiting the scope of the pin clamp assembly in any manner.

DETAILED DESCRIPTION OF THE DRAWINGS

Figure 1:
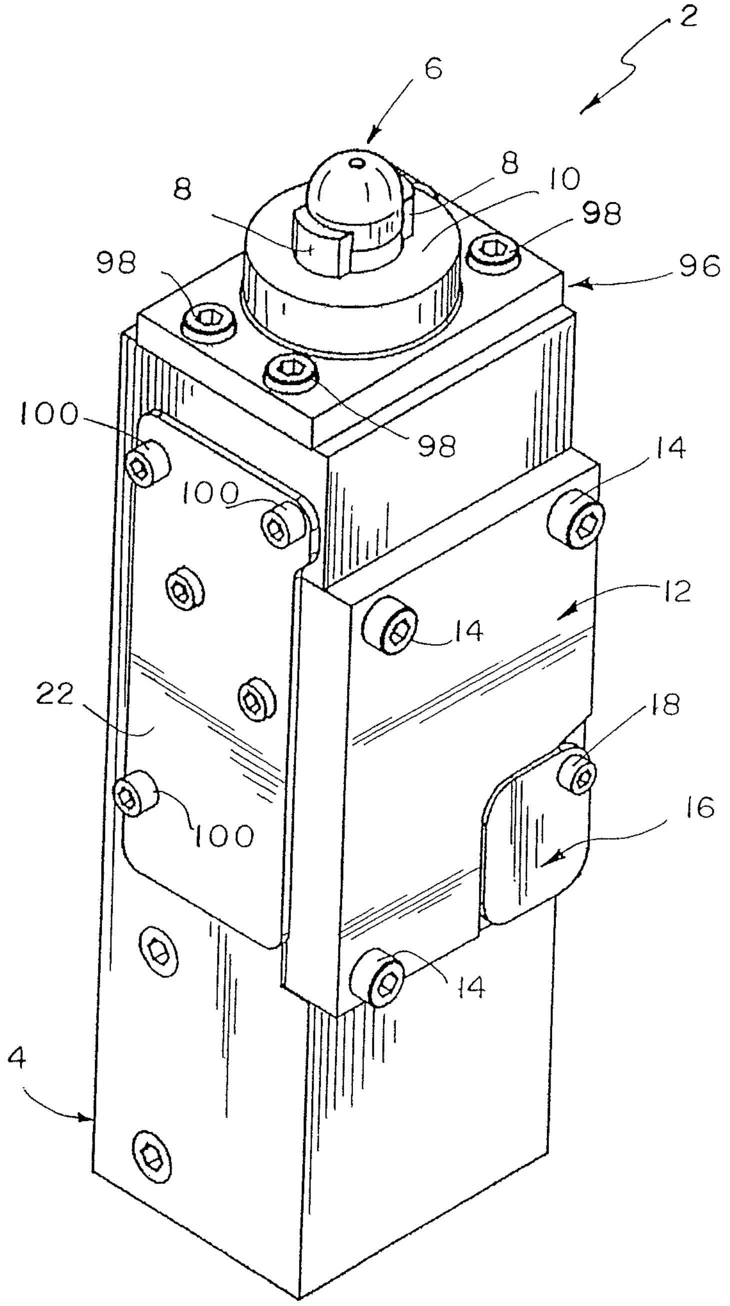
FIG. 1 is a perspective view of an illustrative embodiment of a pin clamp assembly.

A perspective view of an illustrative embodiment of a pin clamp assembly 2 is shown in FIG. 1. Pin clamp assembly 2 illustratively comprises a housing 4 with a locating pin 6 extending therefrom. Fingers 8 are configured to selectively extend and retract from locating pin 6. For example, when locating pin 6 is retracted (as shown), fingers 8 are moved to the extended or clamped position (also as shown). Conversely, when locating pin 6 is extended upwardly, fingers 8 are moved to the retracted or unclamped position. (See, e.g., FIG. 2*a*.) Accordingly, pin clamp assembly 2 has the ability to extend the locating pin 6 through a bore in a workpiece and then retract and use the fingers to hold the workpiece against plate surface 10. Also shown in this view is cover plate 12 illustratively attached to housing 4 via fasteners 14. This plate allows access to the interior of housing 4 without having to disassemble the entire pin clamp assembly 2. A secondary cover 16 is attached to cover plate 12 via fastener 18. This allows selective access to the interior of housing 4 as well. In one illustrative embodiment, the access is to manually unlock mechanism 20. (See e.g., FIGS. 11*a-c*.) This illustrative embodiment also comprises fluid ports (not shown) wherein pneumatic pressure is supplied to the fluid ports to actuate locating pin 6. It is appreciated that in alternative embodiments other actuation sources may be employed. For example, electrical power, or hydraulic fluid power, may be used in place of pneumatic power. Also shown in FIG. 1 is access plate 22 attached to housing 4 via fasteners 100. Illustratively, plate 22 provides access to internal components of the pin clamp assembly. Alternatively, plate 22 can be removed to allow other accessories to be attached and engage those internal components. (See, e.g., FIGS. 14-17.) Also, plate 22 may attach to cam member 26. (See e.g., FIG. 5.)

Figure 2A:
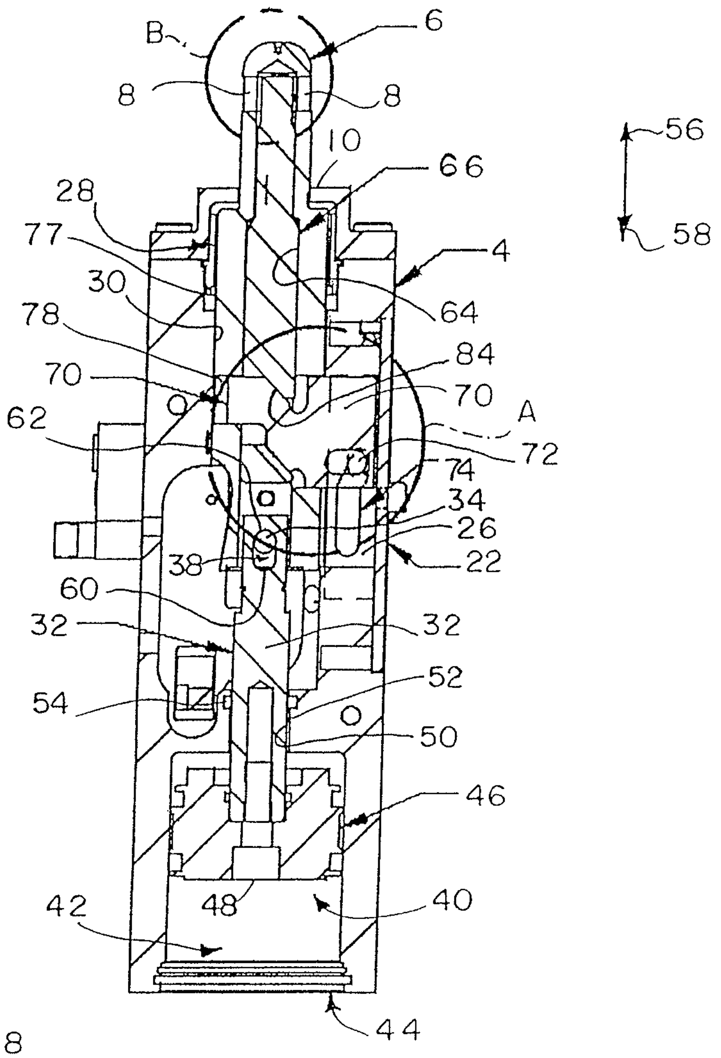
FIGS. 2*a-c* are side-cross-sectional detail views of the pin clamp assembly of FIG. 1, wherein its locating pin is located in an extended position.
Figure 2B:
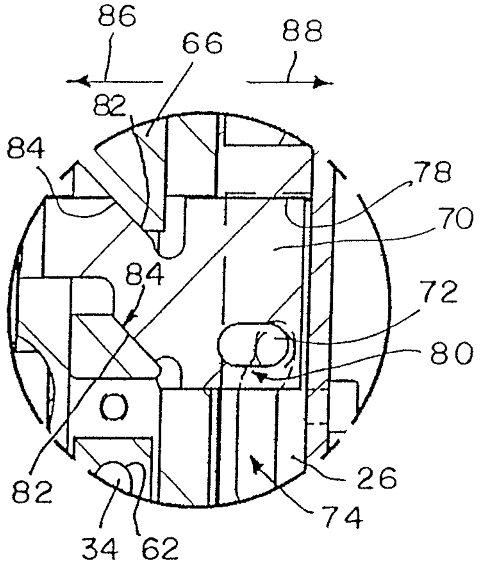
Figure 2C:
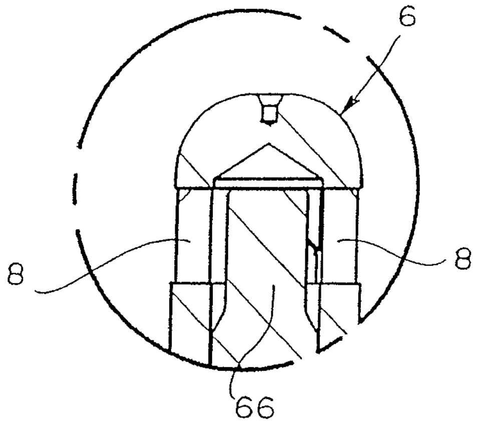

Side-cross-sectional and detail views of pin clamp assembly 2 are shown in FIGS. 2*a* through *c*. Specifically, as shown in FIG. 2*a*, locating pin 6 is shown extending from an opening 28 in housing 4. It is appreciated that in this view locating pin 6 is shown in an extended or typically unclamped position from housing 4. A portion of locating pin 6 is positioned in cavity 30 within housing 4. Fingers 8 shown in their retracted position are located adjacent the distal end of locating pin 6. Illustratively opposite fingers 8 is the attachment of piston rod 32 to locating pin 6. In one illustrative embodiment a pin 34 is disposed through a hole 36 in locating pin 6 (see also FIG. 5*a*) and through an opening or slot 38 disposed in piston rod 32 to hold the structures together. This piston rod 32 is connected to a pneumatic supply assembly 40 that is located within bore 42 of housing 4. Bore 42 is capped at the end by cap assembly 44 which may further comprise any appropriate retaining rings and/or seals. A piston 46 is attached to piston rod 32 illustratively via fastener 48. It is appreciated that the periphery of piston 46 may comprise any appropriate seals to prevent fluid transfer between opposed sections of bore 42. In this illustrative embodiment, piston rod 32 is disposed through bore 50 and extends into cavity 30. It is appreciated from this view that collar 52 which lines bore 50 may serve as a bearing surface for piston rod 32, as well as seal 54 which separates cavity 30 from bore 42. As shown in this illustrated embodiment, as piston moves in direction 56, piston rod 32 moves locating pin 6 in direction 56 as well. As piston 46 moves in direction 58, so too does locating pin 6. In one illustrative embodiment, to move locating pin 6 in direction 56 to an extended position, pin 34 engages end 60 of slot 38. Conversely, to move locating pin 6 in direction 58, piston 46 moves piston rod 32 and pin 34 engages end 62. It is contemplated in an illustrative embodiment slot 38 is provided to allow some independent movement between piston rod 32 and locating pin 6.

Located within a cavity 64 disposed in locating pin 6 is a driving member such as drive rod 66. Drive rod 66 illustratively comprises an angled slot 84 that is configured to receive a driver 70. In an illustrative embodiment, a portion of driver 70 is located in slot 78 which is disposed in locating pin 6. Driver 70 comprises a cam follower 72 that engages slot 74 of cam member 26. Also shown in this view is illustrative wiper seal 77 located within cavity 30 between the inner wall of housing 4 and locating pin 6.

The detail views A and B of FIGS. 2*b* and *c*, respectively, show an illustrative relationship between the position of driver 70 and the ultimate position of fingers 8 located at the distal end of locating pin 6. In the illustrative embodiment, considering the extension of locating pin 6 to be the beginning of the stroke, driver 70 is positioned illustratively to the far right side of slot 78 in direction 88. This lateral positioning of driver 70 may be dictated, at least in part, by the configuration of cam slot 74 of cam member 26. As shown in FIG. 2*b*, an illustrative jog 80 in cam slot 74 moves cam follower 72 in direction 88 drawing driver 70 with it. Driver 70 also illustratively comprises an angled portion that includes angled surfaces 82 that engage a corresponding angled slot 84 disposed in drive rod 66. As can be seen from the figure, when driver 70 is moved laterally with respect to the rectilinear movement of locating pin 6, the angled surfaces 82 disposed in angled slot 84 move drive rod 66 relative to locating pin 6. It is contemplated that in an illustrative embodiment, rectilinear movement of drive rod 66 can be independent of the movement of locating pin 6. The effect of this is that movement of drive rod 66 can move fingers 8 to extended or retracted positions without interfering with the movement of locating pin 6. The configuration of angled surfaces 82 of driver 70 causes drive pin 66 to be elevated which illustratively causes fingers 8 to be located in a retracted position, as shown in FIG. 2*c*.

Figure 3A:
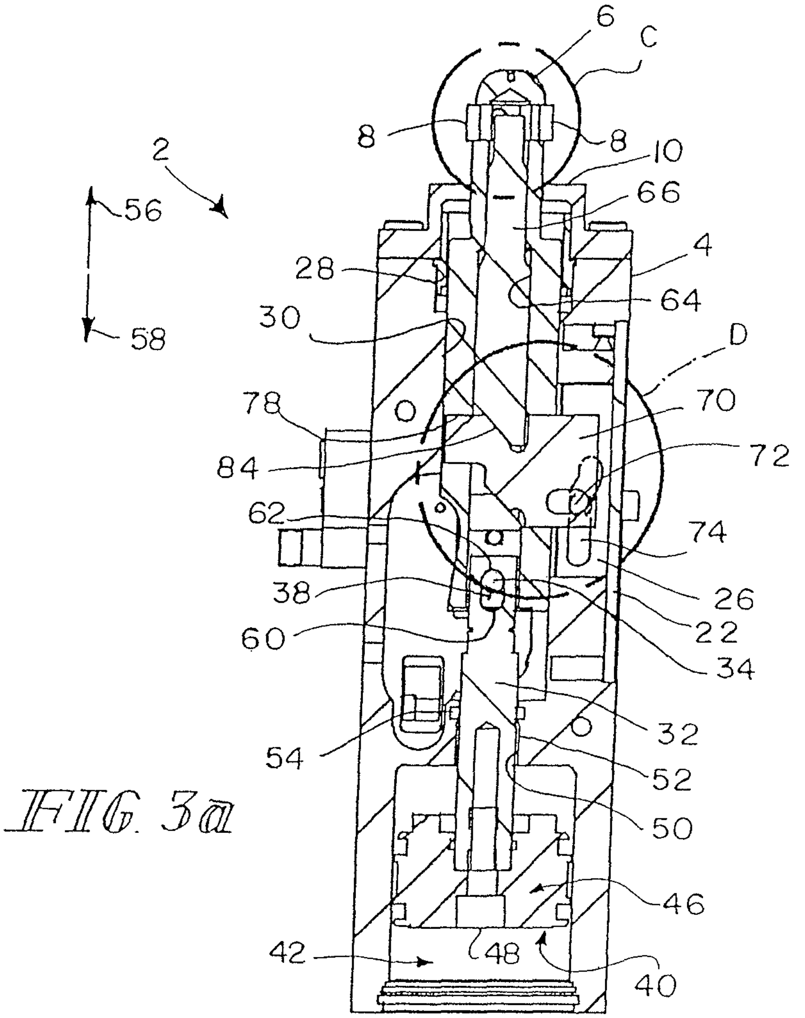
FIGS. 3*a-c* are side-cross-sectional and detail views of the pin clamp assembly of FIG. 1, wherein its locating pin is located in a partially retracted position.
Figure 3B:
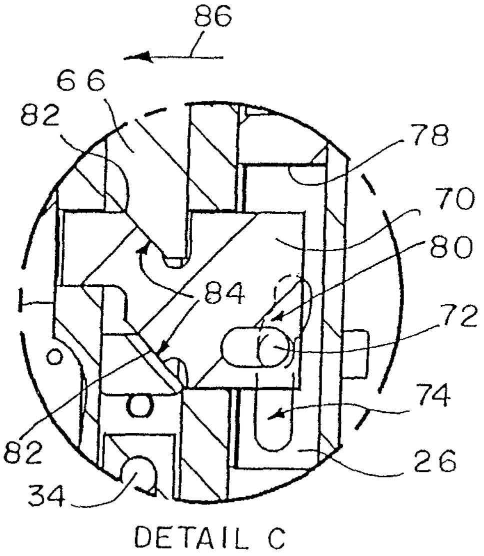
Figure 3C:
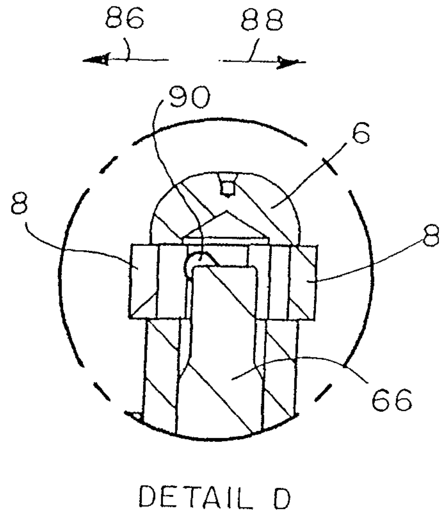

Side-cross-sectional and detail views of pin clamp assembly 2 are shown in FIGS. 3*a* through *c*. Specifically regarding FIG. 3*a*, this view is similar to that shown in FIG. 2*a* except that piston 46 of pneumatic supply assembly 40 is drawn downward in direction 58. As this occurs, piston rod 32 draws locating pin 6 in direction 58 as well, when pin 34 engages end 62 of slot 38. The resulting movement also moves driver 70 in direction 58. Consequently, cam follower 72 follows cam slot 74 which moves driver 70 in direction 86. Because angled surfaces 82 of driver 70 and slot 84 of drive rod 66 angle upward relative to direction 86, drive rod 66 is caused to move downward in direction 58. Because of the engagement between drive rod 66 and fingers 8, as drive rod 66 moves in direction 58, the fingers extend outwardly, illustratively in directions 86 and 88 to a clamping position. (See also FIGS. 8*a-c*.) As shown in detail view C of FIG. 3*b*, cam follower 72 of driver 70 follows cam slot 74 and specifically moves passed jog 80 which displaces driver 70 toward direction 86. Contrasting this view with detail A of FIG. 2*b*, it is evident that moving driver 70 farther in direction 86 within slot 78, allows drive rod 66 to move farther down in direction 58 relative to driver 70. The effect of this movement is evident in detail D of FIG. 3*c* where fingers 8 become spread apart. A partial view of slot 90 disposed in fingers 8 is keyed to a key 92 (see FIGS. 8*a-c*) which causes the fingers to spread in directions 86 and 88 as drive rod 66 is moved downward. It is appreciated that in other embodiments, the configuration of the key and slots can be modified so the fingers will move as desired in response to specific movement of drive rod 66.

Figure 4A:
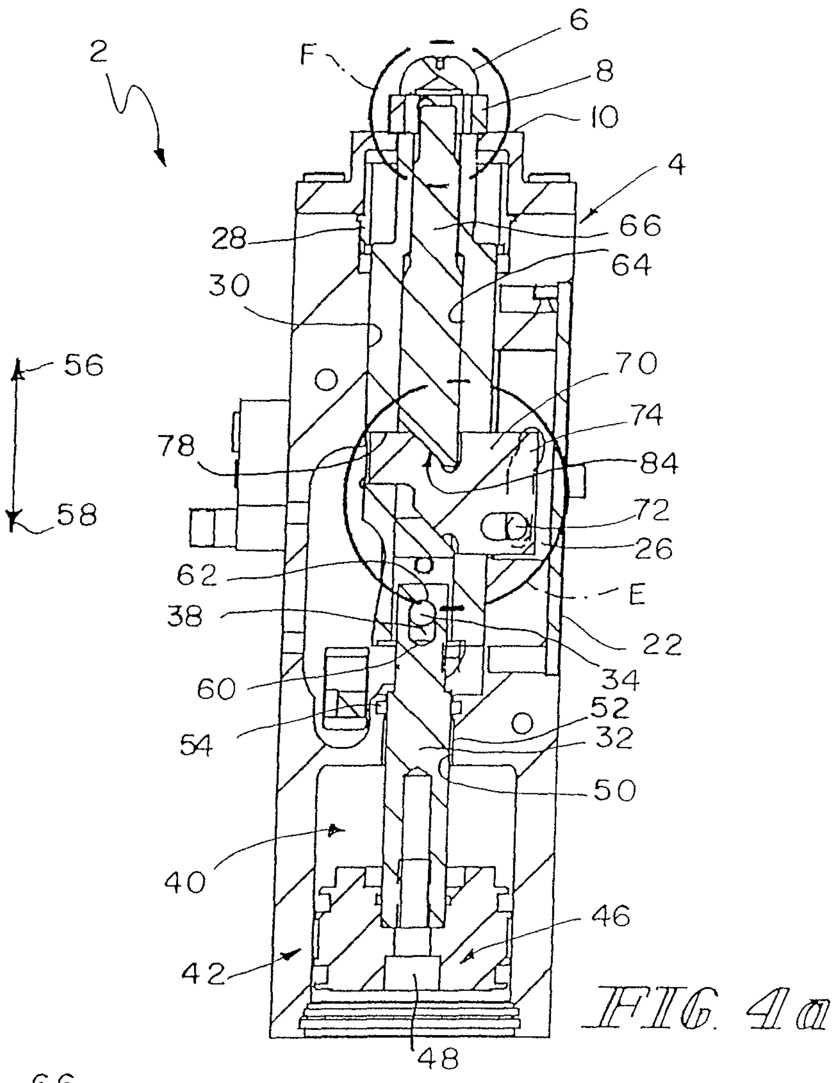
FIGS. 4*a-c* are side-cross-sectional and detail views of the pin clamp assembly of FIG. 1, wherein its locating pin is located in a retracted position.
Figure 4B:
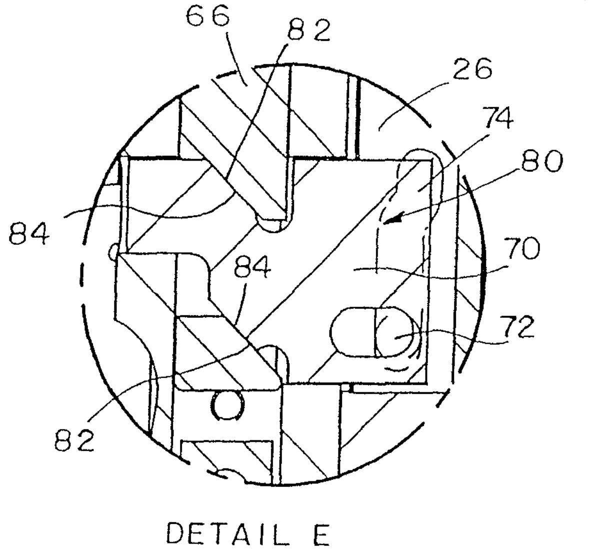
Figure 4C:
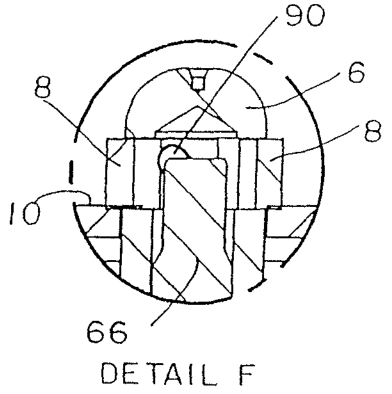

Side-cross-sectional and detail views of pin clamp assembly 2 are shown in FIGS. 4*a-c*. These views are similar to that of FIGS. 2 and 3 with the exception of locating pin 6 moved to the retracted position in direction 58, and the resulting jog of cam follower 72 in slot 74. For example, as shown in FIG. 4*a*, piston 46 moves locating pin 6 further in direction 58. As was the case in FIG. 3, fingers 8 shown in this view are extended and available to engage a workpiece against plate surface 10, for example. Also shown in this view is piston rod 32 engaging end 62 of slot 38 to draw locating pin 6 downward in direction 58. It is contemplated that continued force against piston 46 can maintain locating pin 6 and fingers 8 in the position shown. Specifically regarding detail E of FIG. 4*b*, cam follower 72 is shown to be illustratively moved to its fullest extent within cam slot 74 in direction 58. This maintains the relative downward positioning of drive rod 66 relative to driver 70 which maintains the extension of fingers 8 to the clamp position as shown in detail F of FIG. 4*c*. It is appreciated that the progression shown in FIGS. 2-4 constitutes a stroke of the pin clamp assembly 2. It is contemplated that movement of piston 46 in the opposite direction, direction 56, the structures described herein will move in essentially opposite fashion to extend locating pin 6 upward, which moves driver 70 upward so cam follower 72 traverses jog 80 in cam slot 74. The angled surfaces 82 and slot 84 will draw drive rod 66 upward in direction 56 (while moving driver 70 in direction 88), which based on its engagement with fingers 8 will retract the same to an unclamped position as originally shown in FIG. 2*a*.

Figure 5A:
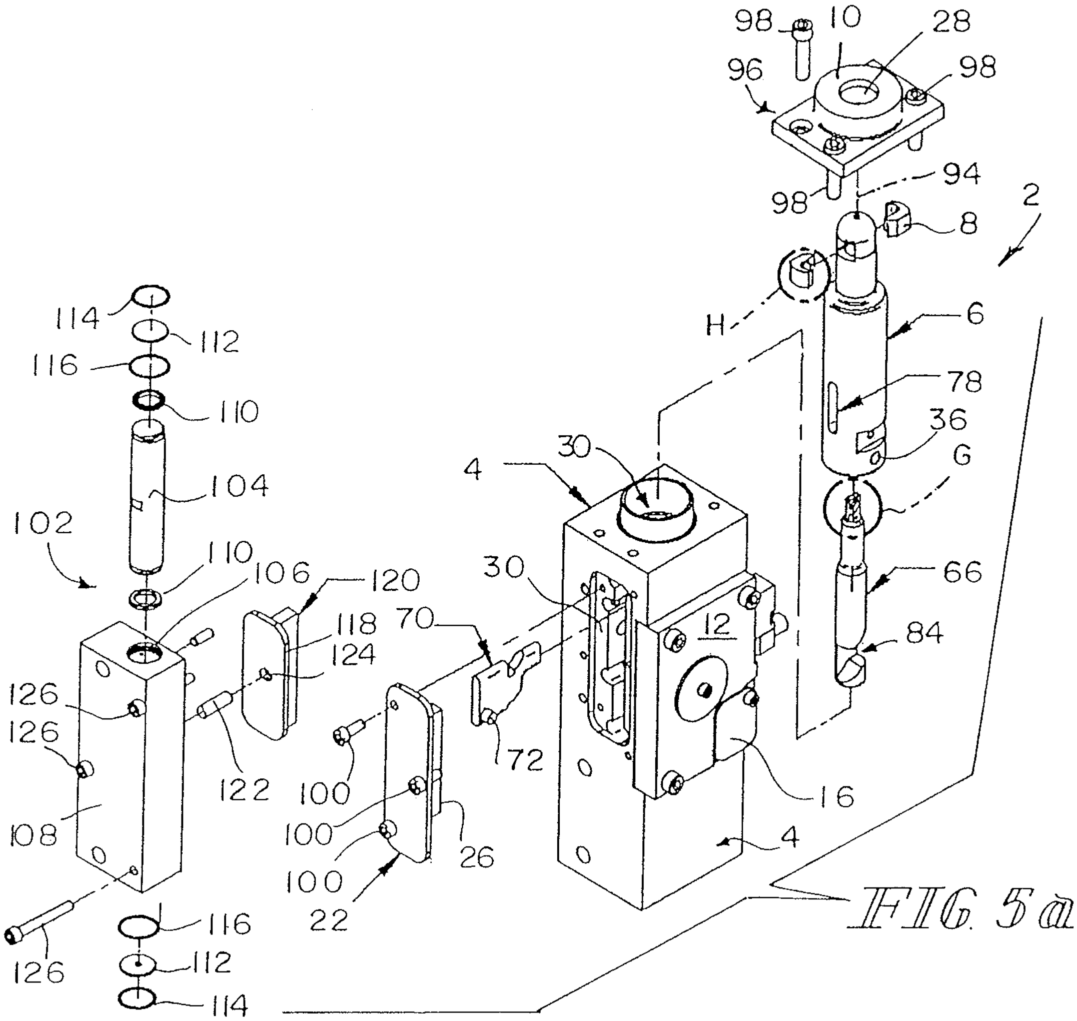
FIGS. 5*a-c* are perspective-exploded and detail views of an illustrative pin clamp assembly.
Figure 5B:
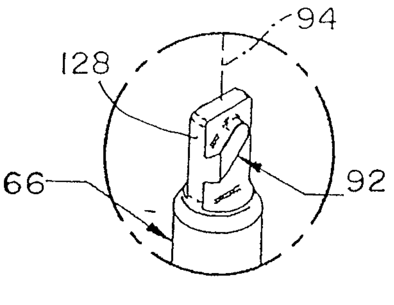
Figure 5C:
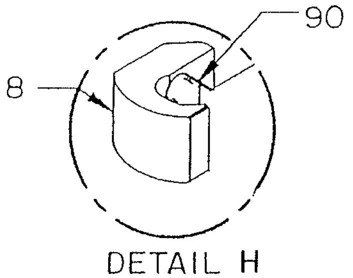

Perspective-exploded and detail views of illustrative pin clamp assembly 2 are shown in FIGS. 5*a-c*. As shown in FIG. 5*a*, housing 4 is configured to receive locating pin 6 and drive rod 66 within cavity 30. A longitudinal axis 94 is shown disposed through locating pin 6 and drive rod 66. As previously discussed, drive rod 66 is configured to be inserted into locating pin 6. Plate surface 10 is shown to be part of sleeve 96 that is attached to housing 4 via fasteners 98. It is contemplated that longitudinal axis 94 illustratively extends through opening 28 disposed in sleeve 96. Also shown in this view is slot 78 disposed through locating pin 6 and configured to receive driver 70, and slot 84 disposed in drive rod 66 receives the angled surfaces 82 of driver 70. Also shown in this view is driver 70 with cam follower 72 extending therefrom and configured to be located within cavity 30 of housing 4. It is also appreciated how cam member 26 along with access plate 22 can be attached to housing 4 via fasteners 100. It is contemplated that in additional embodiments, access plate 22 and/or cam member 26 can be selectively replaced with an alternative accessory. For example, also shown in this view is strip-off cylinder assembly 102. (See also FIGS. 15-17.) As further discussed herein, strip-off cylinder assembly 102 can move the fingers as desired while locating pin 6 is moved to either its extended or retracted position relative to housing 4. What is shown in FIG. 5*a* specifically, is an illustrative piston 104 located within a cavity 106 of strip-off housing 108. Piston 104 is configured to move rectilinearly within housing 108. Various seals 110 border the periphery of piston 104. Caps 112 along with retaining rings 114 and seals 116 caps cavity 106 of housing 108. A modified access plate 118 and cam member 120 can be located on housing 4 similar to that described with regard to access plate 22 and cam member 26. Illustratively a pin 122 is configured to be disposed within an opening 124 of access plate 118 to allow engagement of pin 122 within cavity 30 of housing 4, as described and illustratively characterized further herein. Fasteners 126 attach housing 108 along with access plate 118 and cam member 120 onto housing 4 similar to that previously discussed with regard to access plate 22 and cam member 26.

The detail views G and H of FIGS. 5*b* and *c* show an illustrative configuration of drive rod 66 and fingers 8. In this illustrative embodiment, as shown in detail G of FIG. 5*b*, the distal end of drive rod 66 illustratively comprises a tang 128 that has an illustrative angled key 92 extending therefrom. Finger 8, as shown in detail H of FIG. 5*c*, has an angled slot 90 disposed therein configured to receive angled key 92. It is appreciated that both sides of tang 128 may have such an angled key 92 and, furthermore, the keys may be configured to be angled in opposed directions (see also FIG. 8*a*). It is appreciated from this and other views that keys 92 are angled with respect to longitudinal axis 94, so that as drive rod 66 moves rectilinearly along longitudinal axis 94, keys 92 can move the fingers 8 laterally with respect to that longitudinal axis. It can be further appreciated that providing structures at such an angle with respect to a particular axis can be used to translate movement laterally to that axis. In other words, such angled bodies can facilitate movement in both X and Y directions. (See, FIG. 8.)

Figure 6B:
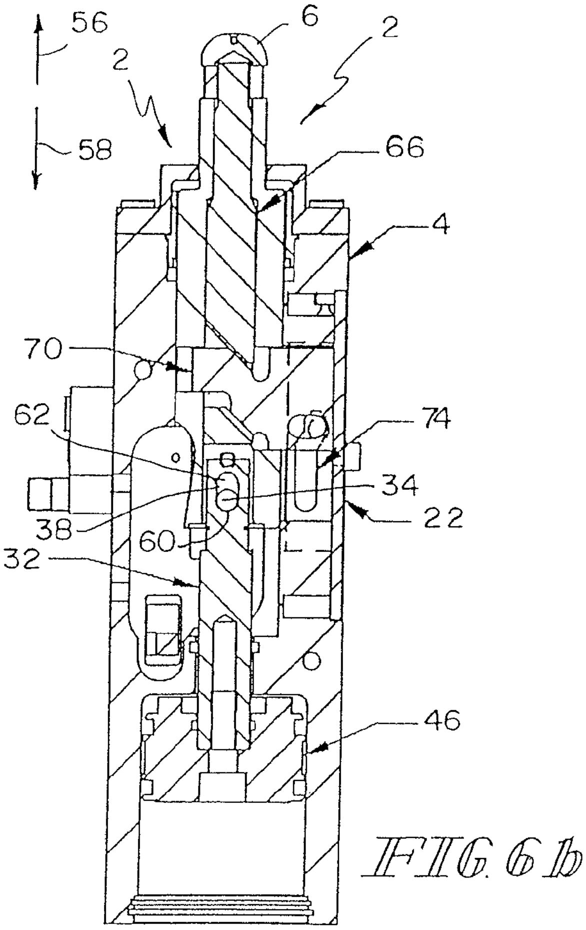
FIGS. 6*a-c* are end and side-cross-sectional views of a pin clamp assembly, wherein the sectional views of FIGS. 6*b* and *c* are taken along section lines A-A and B-B, respectively, of FIG. 6*a;*
Figure 6A:
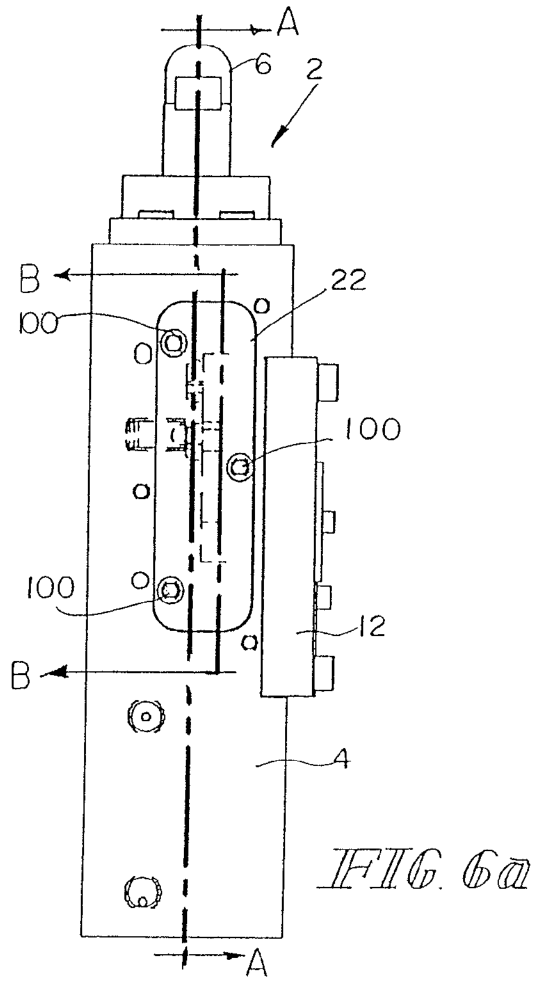
Figure 6C:
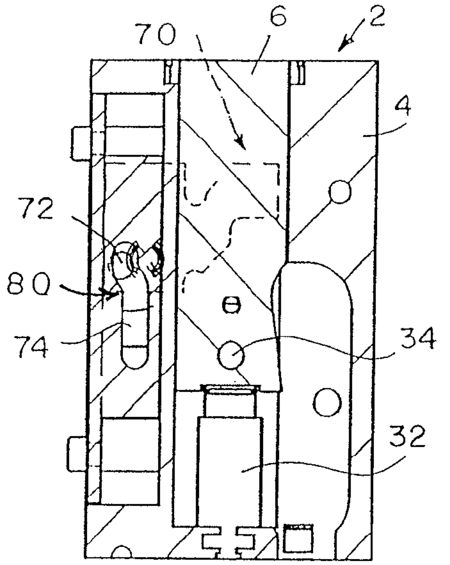

End and side-cross-sectional views of pin clamp assembly 2 are shown in FIGS. 6*a-c*. The section views of FIGS. 6*b* and *c* of pin clamp assembly 2 were taken along lines A-A and B-B, respectively, as shown in the end view of clamp assembly 2 in FIG. 6*a*. The sectional view shown in FIG. 6*b* is similar to that shown in FIGS. 2-4 except that here, end 60 of slot 38 engages pin 34. This is illustratively the effect of piston 46 moving locating pin 6 upward in direction 56 to extend locating pin 6. The sectional view of FIG. 6*c* is a reverse-angled detail view of locating pin 6 that includes driver 70 and shows the interaction between cam follower 72 and cam slot 74.

Figure 7B:
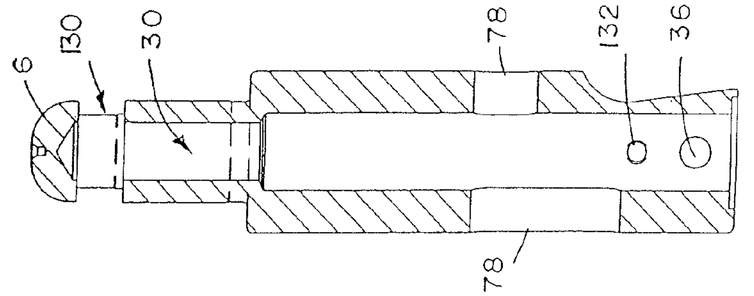
FIGS. 7*a* and *b* are side-elevational and cross-sectional views of an illustrative embodiment of a locating pin, wherein the cross-section shown in FIG. 7*b* is taken from lines C-C of FIG. 7*a;*
Figure 7A:
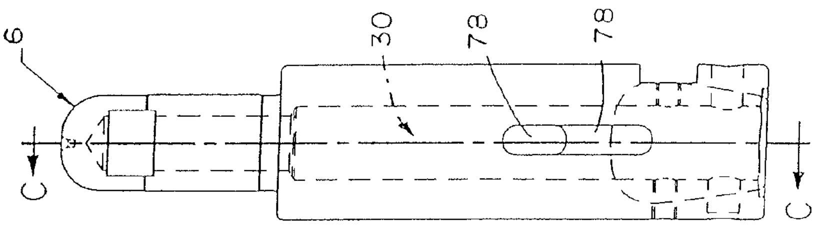

Side-elevational and cross-sectional views of an illustrative embodiment of locating pin 6 is shown in FIGS. 7*a* and *b*. The cross-sectional view shown in FIG. 7*b* is taken along lines C-C of FIG. 7*a*. Illustratively, locating pin 6 comprises a recess 130 that is configured to receive tang 128 of drive rod 66, as well as fingers 8. This recess leads into cavity 30 disposed within locating pin 6 which receives drive rod 66. Slot 78 is shown disposed through locating pin 6 traversing cavity 30 and extending out the periphery of locating pin 6 at opposed ends. Slot 78 also illustratively varies at each end of locating pin 6. This configuration is illustrative to accommodate the configuration of driver 70. It is appreciated, however, that the configuration of slot 78 can vary to accommodate a driver of alternate configuration. Also shown in this view is bore 36 that receives pin 34 and bore 132 that is configured to receive a fastener for an illustrative spring holder that is used on the locking mechanism 20 discussed further herein. (See also FIG. 11.)

Figure 8B:
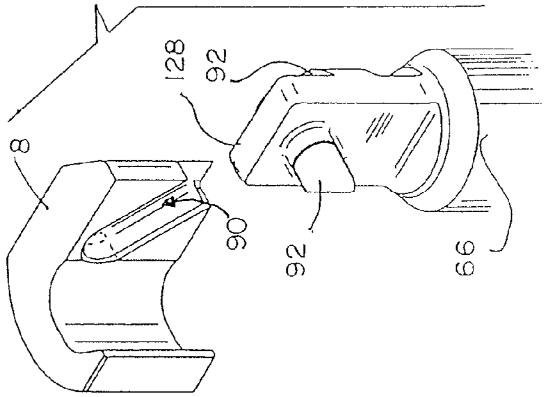
FIGS. 8*a-c* are end and side-elevational, perspective-exploded, and side and top views of an illustrative embodiment of a drive rod and a finger, respectively.
Figure 8C:
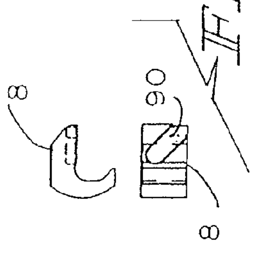
Figure 8A:
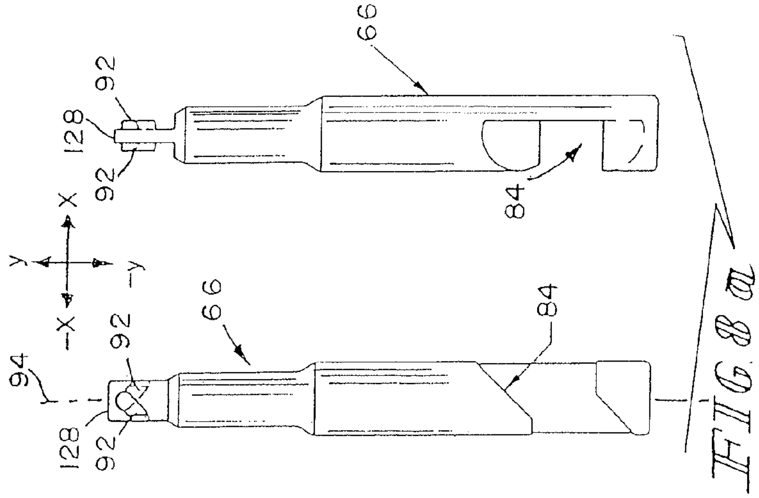

End and side-elevational, perspective-exploded and side and top views of illustrative embodiments of drive rod 60 and finger 8 are shown in FIGS. 8*a-c*. The views of drive rod 66 in FIG. 8*a* show the angle of slot 84 relative to the longitudinal axis 94. Similarly, angled keys 92 are located on each side of tang 128 as well. Also shown in this view is how keys 92 on each side of tang 128 are angularly oriented in opposite directions. For this illustrative embodiment, the two fingers 8 are configured to extend outwardly from locating pin 6 to assist clamping a workpiece. For example, as shown herein, drive rod 66 is moveable along the Y, −Y axis. Such angled keys 92 can typically provide a path in both X and Y directions. Here, one key 92 provides a path in the X, Y direction and the opposite key 92 provides a path in the Y, −X direction. Fingers 8, however, are confined from moving in the Y, −Y axis by the proximal end of locating pin 6. (See also FIG. 7.) Consequently, fingers 8 illustratively only move in either the X or −X direction, as shown in FIGS. 2-4. It can be appreciated, however, that alternate embodiments of the key can move the fingers in other directions.

The perspective-exploded view of drive rod 66 and finger 8 and FIG. 8*b*, depicts how the two structures will mate. In this case, slot 90 is engagable with key 92 on one side of tang 128. It is appreciated that the second finger 8 has a similar slot that engages key 92 on the other side of tang 128. Additional views of finger 8 are shown in FIG. 8*c*. It is appreciated that in other embodiments, finger or fingers 8 can be modified to move in a direction as desired, resulting from the rectilinear movement of drive rod 66.

Figure 9C:
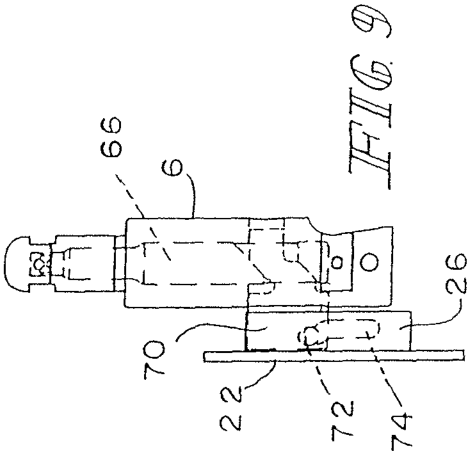
FIGS. 9*a-c* are side and end views of an illustrative embodiment of a driver, along with a detail view of the driver engaging a cam member, drive rod and locating pin.
Figure 9A:
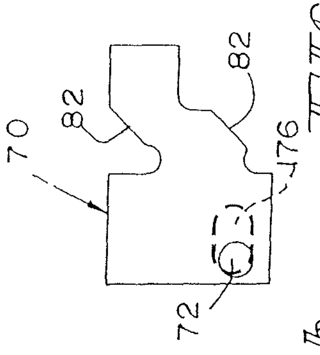
Figure 9B:
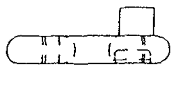

Side and end views of an illustrative embodiment of driver 70, along with an isolated detail view of driver 70 with locating pin 6, cam 26, and access plate 22 are shown in FIGS. 9*a-c*. The view of driver 70 in FIG. 9*a* shows an illustrative configuration that includes angled surfaces 82 that are configured to be received in slot 84 of drive rod 66. The end view of driver 70 shown in FIG. 9*b* also shows a profile view of cam follower 72. It is appreciated that alternative embodiments of driver 70 may include a cam follower of different configuration to follow a cam slot. And FIG. 9*c* shows an isolated side view of driver 70 and its associated structures including locating pin 6 and cam member 26.

Exploded, perspective, and cross-sectional detailed views of an illustrative shim and sleeve assembly 140 are shown in FIGS. 10*a-c*, respectively. As shown in the exploded view of FIG. 10*a*, shim and sleeve assembly 140 comprises a sleeve 96 that is fastened to the top of housing 4 via fasteners 98 disposed through bores 142 and 144 of sleeve 96 and housing 4 respectively. In one illustrative embodiment, shims 138 include bores 146 disposed therethrough that also receive fasteners 98. Shims 138 can, thus, be sandwiched and secured between sleeve 96 and housing 4. It is appreciated, however, that the thickness of shims 138 can be any amount that is useful to provide a desirable amount of shrouding about locating pin 6. The perspective view of shim and sleeve assembly 140 is shown in FIG. 10*b*. This view shows how locating pin 6 extends from opening 28 of sleeve 96. The cross-sectional view of FIG. 10*c* further illustrates the utility of shims 138. As shown herein, shims 138 allow sleeve 96 to be adjusted upward or downward along locating pin 6. The use of such shims 138 means that the top surface of sleeve 96 may not require machining to obtain a desired amount of shrouding about locating pin 6.

Figure 11A:
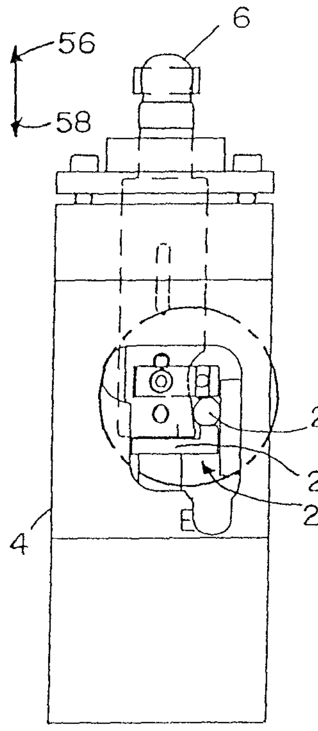
FIGS. 11*a-c* are side and detail views respectively, of a portion of the pin clamp assembly showing an illustrative embodiment of a locking mechanism.
Figure 11B:
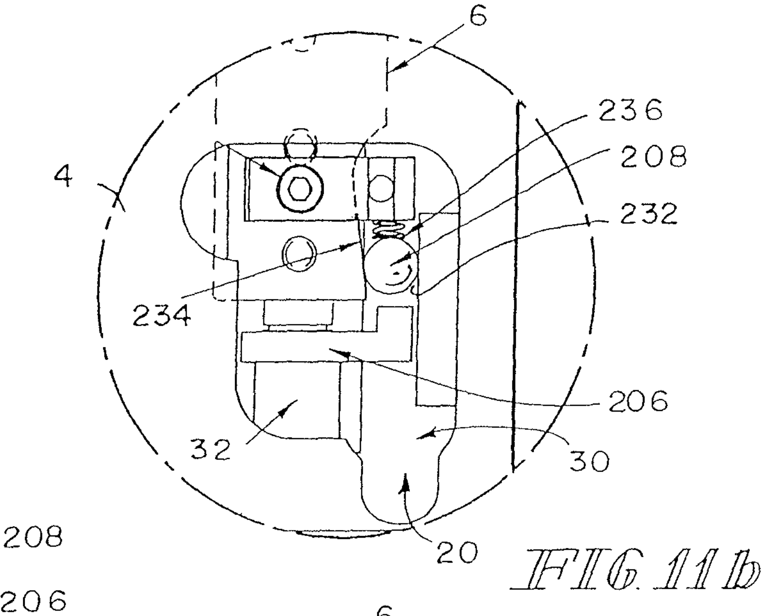
Figure 11C:
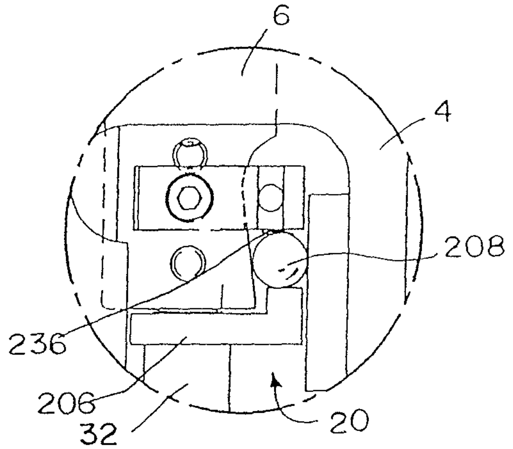

Side and detail views of locking/unlocking mechanism 20 of pin clamp 2 are shown in FIGS. 11*a-c*. As shown in FIGS. 11*a* and *b*, cavity 30 is formed in housing 4. Cavity 30 provides access to locating pin 6, as well as piston rod 32. In one illustrative embodiment, mechanism 20 is configured to be a locking mechanism. This can be particularly useful during loss of fluid power to clamp 2. Illustratively, when locating pin 6 is moved in the downward direction 58, the location of pin 208 with respect to the locating pin 6 is caused to be wedged between surfaces 232 and 234 by the bias created from spring 236. This wedging between the two surfaces prevents locating pin 6 from moving upwardly in direction 56. To unlock mechanism 20, as shown in FIG. 11*c*, lock release 206 or other structure or mechanism can push pin 208 upward unwedging pin 208 from between surfaces 234 and 232. The force of this upward movement should be greater than the downward bias of spring 236 to cause pin 208 to position itself in a nonwedging position between surfaces 234 and 232. The illustrative shape of cam surface 234 is such that in the lower position, that surface serves as a wedging surface, whereas farther upward thereon, it no longer possesses such wedging properties. Mechanism 20 can also be configured to manually move locating pin 6 upward in direction 56 to retract fingers 8 and allow release of any held workpiece. For example, when power is restored to clamp 2, the force of that power is sufficient to overcome the wedging force created by pin 208 and surfaces 232, 234. This is illustratively accomplished by the lock release 206 attached to piston rod 32 as shown in FIG. 5*c*. In this illustrative embodiment, slot 38 and piston rod 32 (see FIG. 2*a*) allow movement of piston rod 30 to some extent before it engages and moves locating pin 6. In this embodiment that extent of travel is enough to allow head 238 of lock release 206 to engage pin 208. Using the force of the traveling piston rod 30, pin 208 is pushed out of the way, thus, unwedging it from between surfaces 132 and 134 prior to piston rod 30's engagement and movement of locating pin 6. Once pin 208 is unwedged, locating pin 6 will be free to move upwardly in direction 56.

Figure 12B:
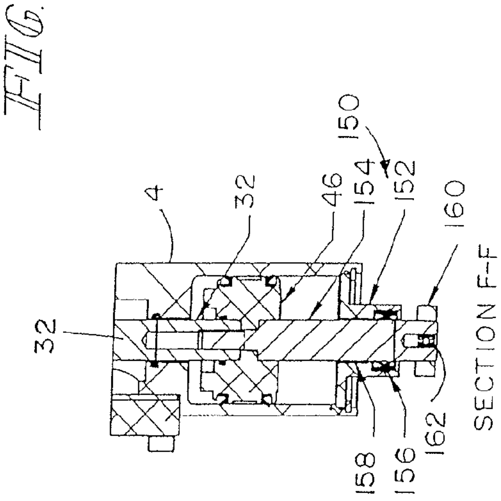
FIGS. 12*a* and *b* are side and detail-cross-sectional views of a pin clamp assembly, wherein the detail-cross-sectional view of FIG. 12*b* is taken along lines F-F of FIG. 12*a;*
Figure 12A:
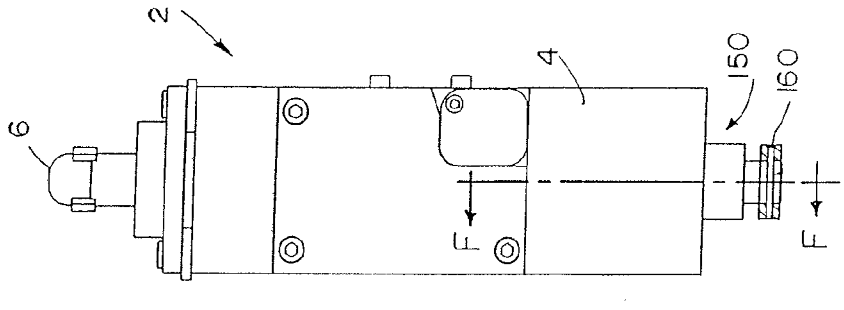

Side and detail-cross-sectional views of pin clamp assembly 2 are shown in FIGS. 12*a* and *b*. The section view shown in FIG. 12*b* was taken along lines F-F of FIG. 12*a*. In this illustrative embodiment, a location sensing flag 150 can be employed. Also in this illustrative embodiment, a standard bore plug at the end of the pin clamp assembly 2 can be replaced by a flag bore plug 152. A secondary piston rod 154 can then be attached to piston 46 and, illustratively, pass therethrough to thread or otherwise attach to piston rod 32. Plug 152 may illustratively comprise a rod wiper/seal 156, as well as a rod bearing 158 that receives secondary piston rod 154. A flag 160 is mounted to secondary piston rod 154, illustratively external of clamp body 4 and secured to rod 154 via spring pin 162. Flag 160 can be used as a target for a laser, optical, or other sensor, which detects when the clamp is in an extended or retracted position. It is appreciated that the configuration of assembly 150 shown is illustrative. It is contemplated that in alternate embodiments the flag can be of a shape or configuration useful for assisting and detecting the position of structures of pin clamp assembly 2.

Figure 13A:
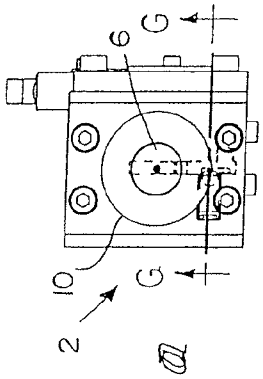
FIGS. 13*a-c* are top, side-cross-sectional, and detail views of a pin clamp assembly showing an illustrative embodiment of a detent assembly, wherein the cross-sectional and detail views of FIGS. 13*b* and *c* are taken along lines G-G of FIG. 13*a;*
Figure 13B:
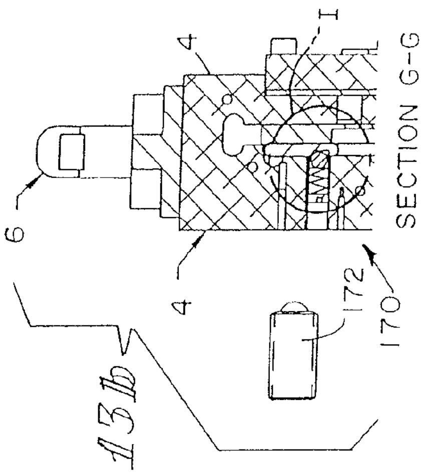
Figure 13C:
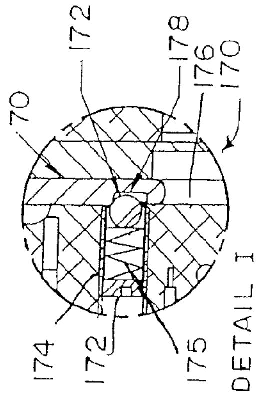

Top, side-cross-sectional, and detail views of clamp assembly 2 disclosing an illustrative embodiment of a detent assembly 170 is shown in FIGS. 13*a-c*. The cross-sectional view of pin clamp assembly 2 shown in FIG. 13*b* is taken along lines G-G of FIG. 13*a*, and the detail view of FIG. 13*c* is taken from detail I of the cross-sectional view of FIG. 13*b*. Detent assembly 170 can be used to prevent locating pin 6 from moving until some force of specified value causes it to be freed from the detent assembly. In this illustrative embodiment, a detent 172, such as a ball detent or other custom or commercially available detent can be located within a bore 174 disposed in housing 4. Bore 174 is in communication with a slot or other cavity 176. Ball detent 172 is engagable with driver 70 having a portion of the same located in slot 176. In an illustrative embodiment detent 172 engages a detent slot 178 or other similar formation in driver 70. Detent 172 is biased against driver 70 and is configured to engage slot 178 when driver 70 is located at a particular location along the stroke of locating pin 6. In one illustrative embodiment, such a location is where locating pin 6 is at full extension, as shown in FIG. 13*b*. It is appreciated, however, that such a slot 178 can be located anywhere along the stroke of locating pin 6. When detent 172 engages cavity 178, locating pin 6 is effectively locked into place. A force such as the fluid pressure acting on piston 46 may be used to overcome the bias force 175 from detent 172 against slot 178 to overcome the same and allow driver 70 and, thus, locating pin 6 to unlock.

Figure 14B:
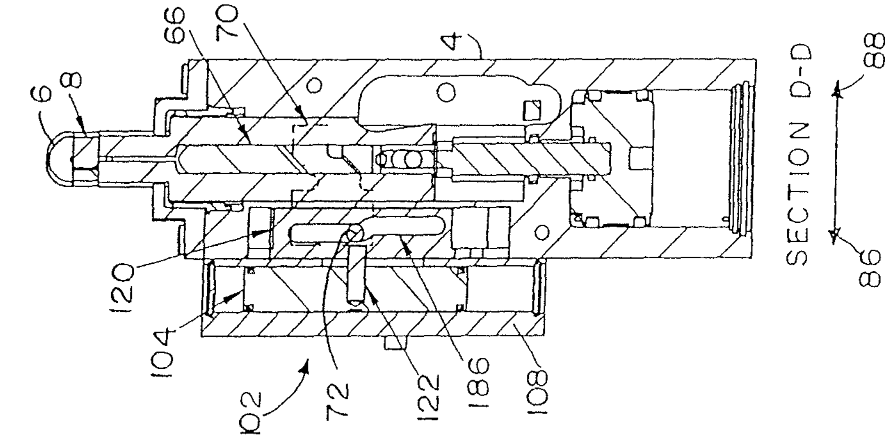
FIGS. 14*a* and *b* are front elevational and side-cross-sectional views of an illustrative pin clamp assembly, wherein the cross-sectional view of FIG. 14*b* is taken along lines D-D of FIG. 14*a;*
Figure 14A:
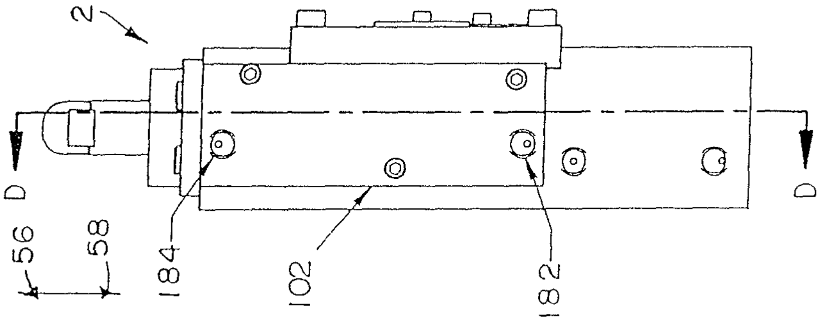

Front elevational and side-cross-sectional views of another illustrative embodiment of pin clamp assembly 2 are shown in FIGS. 14*a* and *b*. The cross-sectional view of pin clamp assembly 2 shown in FIG. 14 is taken along lines D-D of FIG. 14*a*. This illustrative embodiment includes strip-off cylinder assembly 102. In this illustrative embodiment, strip-off cylinder assembly 102 can move fingers 8 when locating pin 6 is located in either extended or retracted positions. Illustratively, as port 182 of strip-off cylinder housing 108 is pressurized, pin 122, coupled to cylinder piston 104, causes the cam member 120 to move upward in direction 56. This causes driver 70 to move, illustratively, in direction 88 in clamp housing 4. As this occurs, drive pin 66 is forced downward in direction 58 by means previously discussed. This motion causes fingers 8 to move out of locating pin 6, even when it is in the extended position. Conversely, when port 184 of strip-off cylinder housing 108 assembly is pressurized, cam member 120 is moved downward in direction 58. This causes driver 70 to move, illustratively, in direction 86. This causes drive pin 66 to move upward in direction 56 inside locating pin 6 which causes fingers 8 to retract, even if locating pin 6 is already in the retracted position. It is appreciated that the strip-off cylinder assembly 102 may cause movement of the fingers independent of movement of locating pin 6. For example, locating pin 6 may even be stationary during the movement of driver 70 when strip-off cylinder assembly 102 is activated. This allows control over extension or retraction of fingers 8 independent of the movement of locating pin 6. This can be useful in instances where sheet metal or other workpieces get bound-up or otherwise stuck on locating pin 6. It is further appreciated that cam follower 72 or driver 70 operates in cam path 186 similar to cam slot 74 in previous embodiments. (See, e.g., FIG. 2*a*.)

Figures 15A, 15B, 15C:
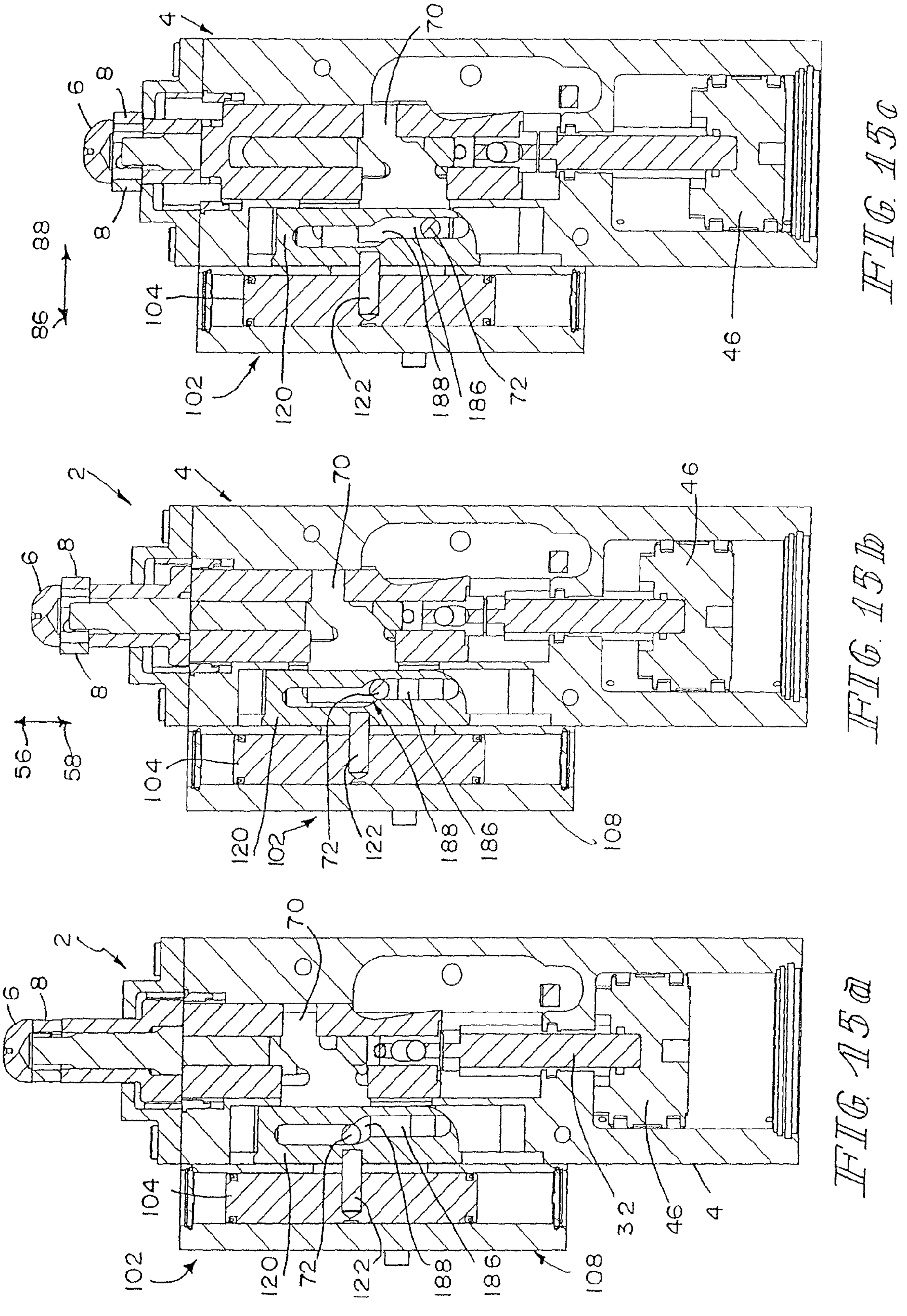
FIGS. 15*a-c* are cross-sectional views of a pin clamp assembly including an illustrative embodiment of a strip-off cylinder assembly, wherein the progression of movement shows the fingers extending as the locating pin retracts.
Figure 16A:
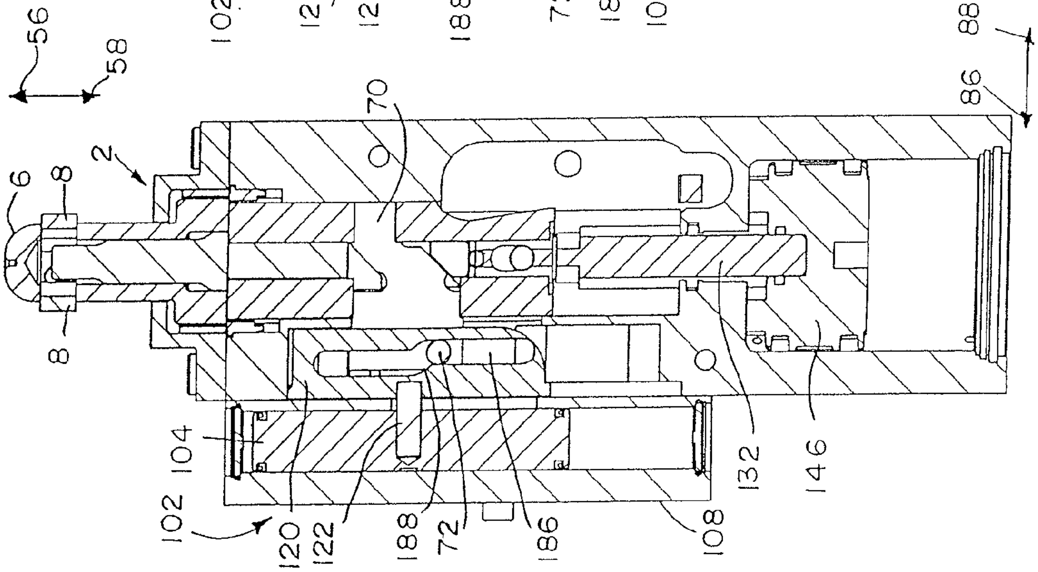
FIGS. 16*a-c* are cross-sectional views of a pin clamp assembly showing a progression view of the strip-off cylinder assembly of FIG. 15, wherein the fingers remain in an extended position during movement of the locating pin.
Figure 16B:
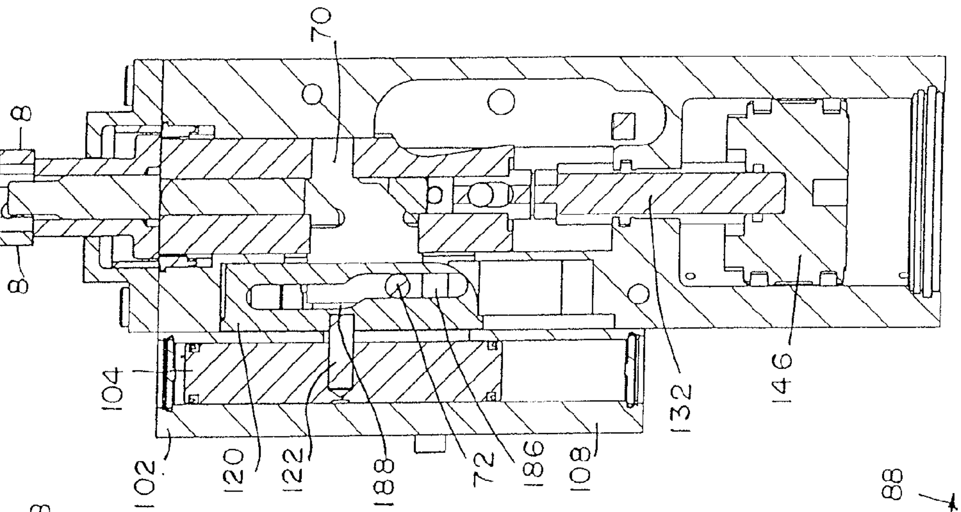
Figure 16C:
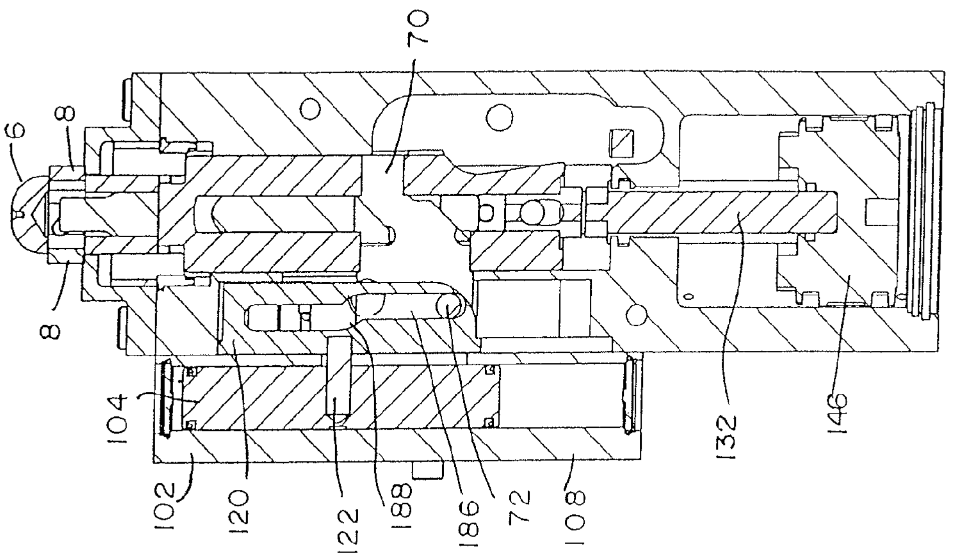
Figure 17C:
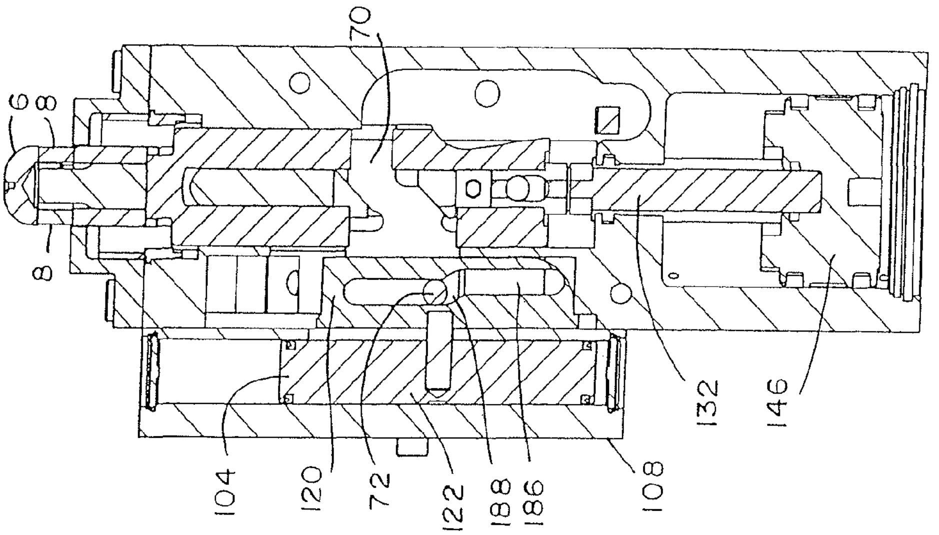
FIGS. 17*a-c* are cross-sectional views of a pin clamp assembly showing a progression view of the pin clamp assembly similar to FIGS. 15 and 16, but wherein the fingers remain retracted during movement of the locating pin.
Figure 17B:
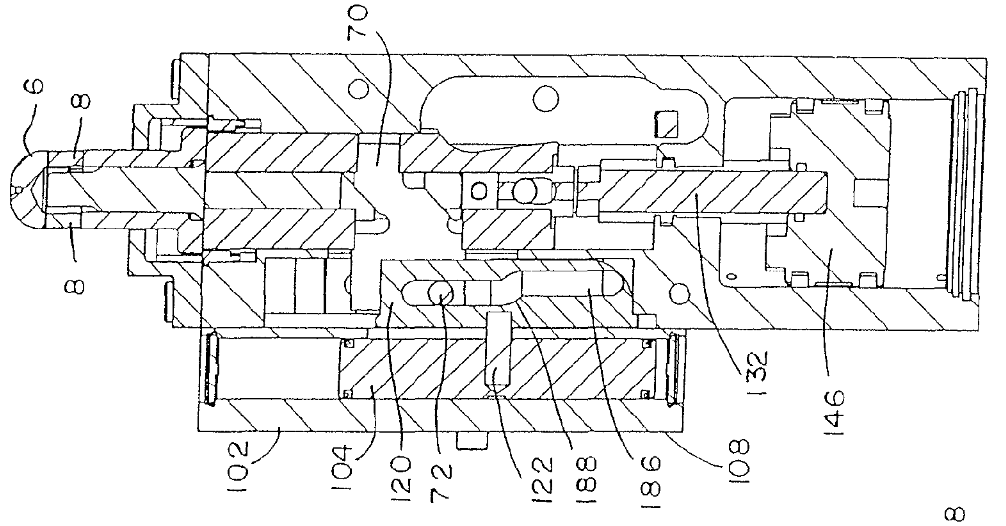
Figure 17A:
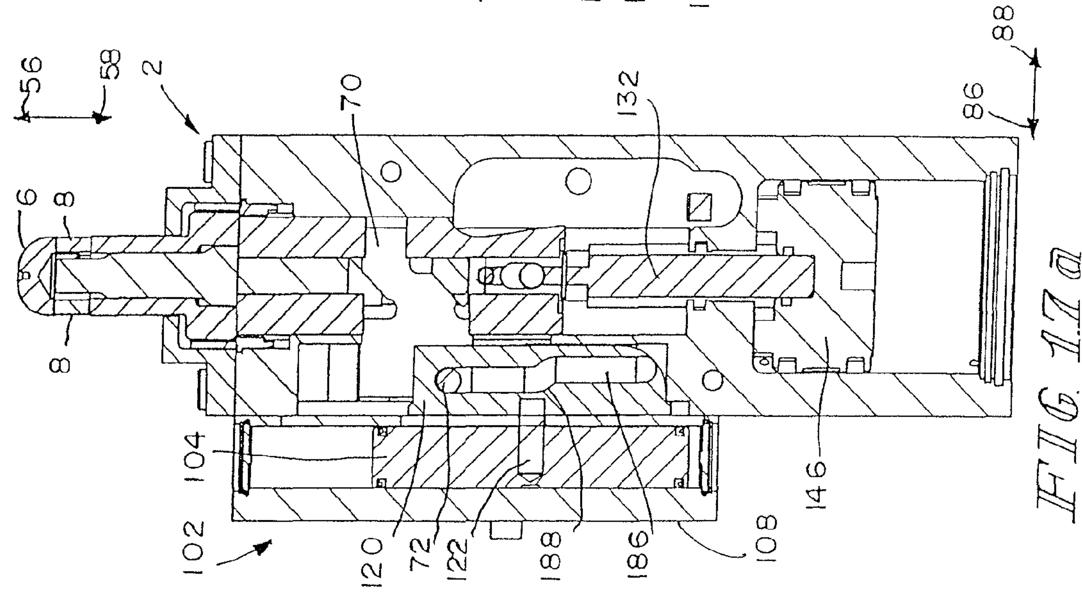

Cross-sectional progression views of pin clamp assembly 2 with strip-off cylinder assembly 102 attached thereto is shown in FIGS. 15-17. These cross-sectional views of pin clamp assembly 2 are similar to those views shown in FIGS. 2-4, but at reverse angle. As shown in FIGS. 15*a-c*, during normal operation, as locating pin 6 retracts, actuation of piston 46 moves the same in direction 58. Fingers 8 extend as previously discussed with respect to FIGS. 2-4. The strip-off cylinder assembly 102 does not interfere with this operation. This is because the position of assembly 102 causes jog 188 located in cam slot 186 to be at about the same position as jog 80 is in cam slot 74 of the previous embodiments. In contrast, as shown in the progression view of FIGS. 16*a-c*, when piston 104 is moved in direction 56, cam member 120 is also moved in the same direction. This has the effect of moving jog 188 upward in direction 56 as well. This has the further effect of keeping driver 70 moved over in direction 88 during the entire stroke of locating pin 6. As this view shows, as piston 46 moves downward in direction 58, cam follower 72 has no opportunity to traverse jog 188 and move driver 70, and, thus, move drive rod 66 upward to retract fingers 8. Consequently, fingers 8 remain in the extended position for the length of the stroke. Conversely, as shown in the progression view of FIG. 17*a-c*, when piston 104 is moved downward in direction 58, as shown therein, so too does cam member 120. This has the opposite effect as that described with respect to FIGS. 16*a-c*. Particularly, cam follower 72 of driver 70 is maintained in the upper portion of cam slot 186 throughout the entire stroke of locating pin 6. The position of cam slot 186 does not allow cam follower 72 to traverse jog 188. Therefore, driver 70 is maintained toward direction 86 which maintains drive rod 66 in an upward position preventing fingers 8 from extending outward, regardless of the movement of either locating pin 6 or piston 46. This allows locating pin 6 to move as desired without having the fingers extend as well. It is appreciated that in an illustrative embodiment, access panel 118 is fixed to cam member 120 and moves therewith upon movement of pin 122 by piston 104.

Figure 18D:
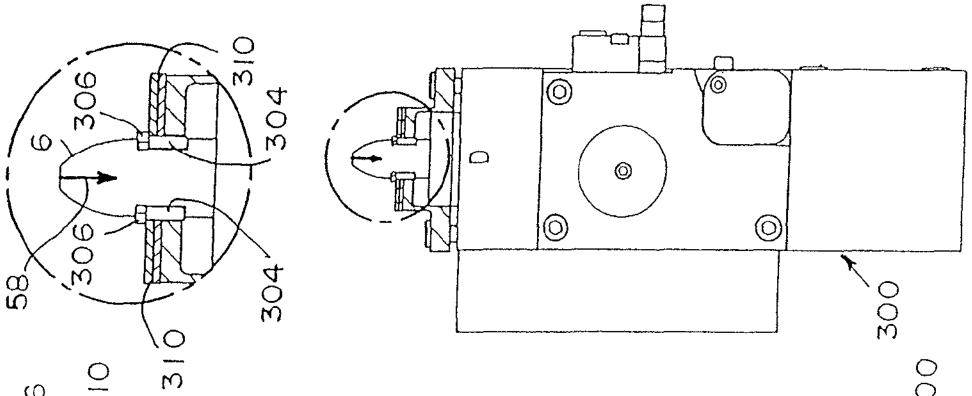
FIGS. 18*a-d* are side views along with corresponding detail views of an additional illustrative embodiment of a pin clamp assembly with an alternative finger configuration.
Figure 18C:
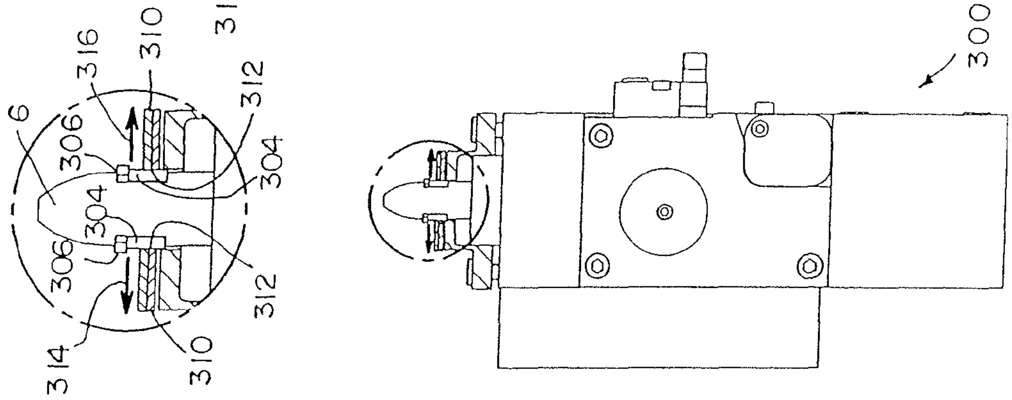
Figure 18B:
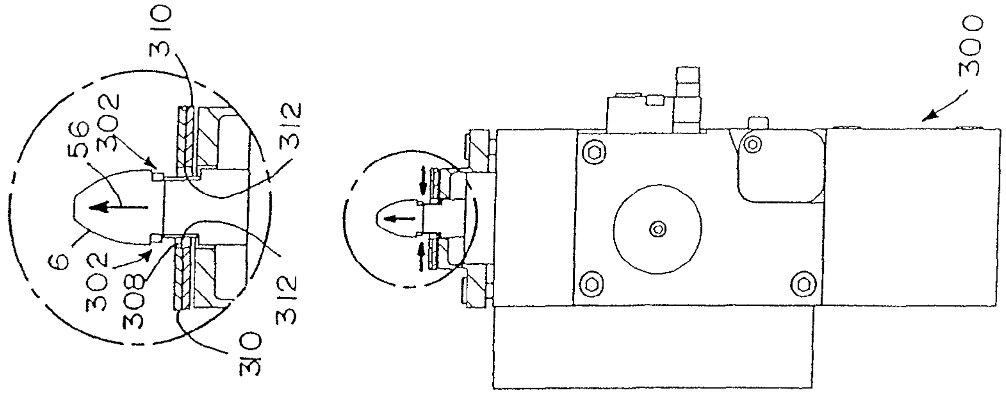
Figure 18A:
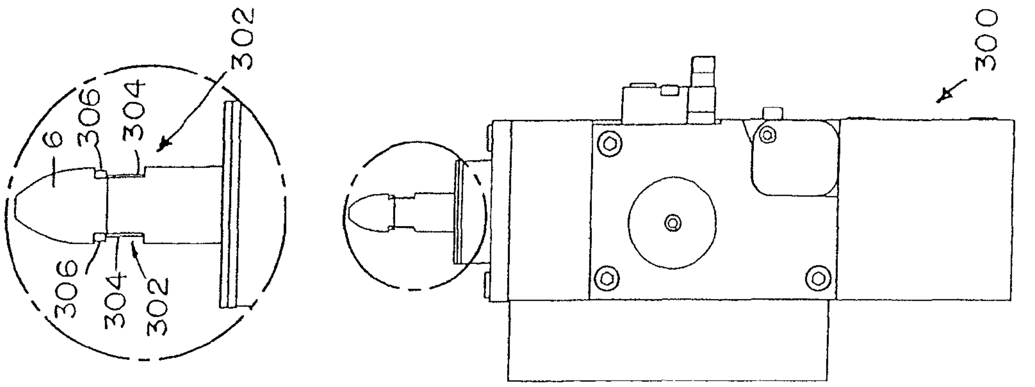

Side views of another embodiment of a pin clamp assembly 300, along with complimentary detail views, are shown in FIGS. 18*a-d*. The view of pin clamp assembly shown in FIG. 18*a* shows locating pin 6 moved in an illustrative full extension. This is typical of the pin clamp assembly according to the previous embodiments. However, the present embodiment includes split fingers 302. An illustrative purpose of these fingers is to assist centering a workpiece on the pin clamp and then clamping down on the workpiece. In an illustrative embodiment, split fingers 302 comprise a centering portion 304 and a clamping portion 306. As shown in the progression views of 18*b-d*, once locating pin is extended through a hole or cavity in the workpiece, centering portion 304 ensures the workpiece is centered on locating pin 6 and then clamped to hold into place. For example, as shown in FIG. 18*b*, locating pin 6 is extended through bore 308 of a workpiece 310, as shown in this view fingers 302 are in a retracted position. A clearly evident effect of this configuration is that the pin clamp does not need to extend so far upward in direction 56. (Compare FIG. 18*b* with FIG. 18*a*.) Illustratively, the centering portion 304 of split fingers 302 face wall surface 312 of bore 308. Once locating pin 6 is in this position, fingers 302 can move outward in directions 314 and 316. The centering portions 304 engage wall 312. This ensures centering of bore 308 illustratively with respect to locating pin 6. As shown in FIG. 18*d*, when locating pin 6 retracts further in direction 58, the clamping portions 306 which are shown to extend radially farther than centering portions 304, clamp down on workpiece 310.

Several views of drive rod 320 and split fingers 302 are shown in FIGS. 19*a-c*. It is appreciated that drive rod 320 can be the same as drive rod 66 disclosed in the previous embodiments. Drive rod 320 may comprise a slot 322 similar to that of slot 84 and may have keys 324 similar to keys 92 of drive rod 66. (Compare with FIG. 8*a* and *b*.) These views, particularly in FIG. 19*c*, show the illustrative configuration of split finger 302. This illustrative embodiment shows finger 302 being similar to fingers 8 disclosed in previous embodiments, particularly slot 326 which is similar to slot 90 in the previous embodiments. It is appreciated, however, that the configuration of split fingers 302 can vary including separate components or structures for the centering and clamping portions.

Figure 20A:
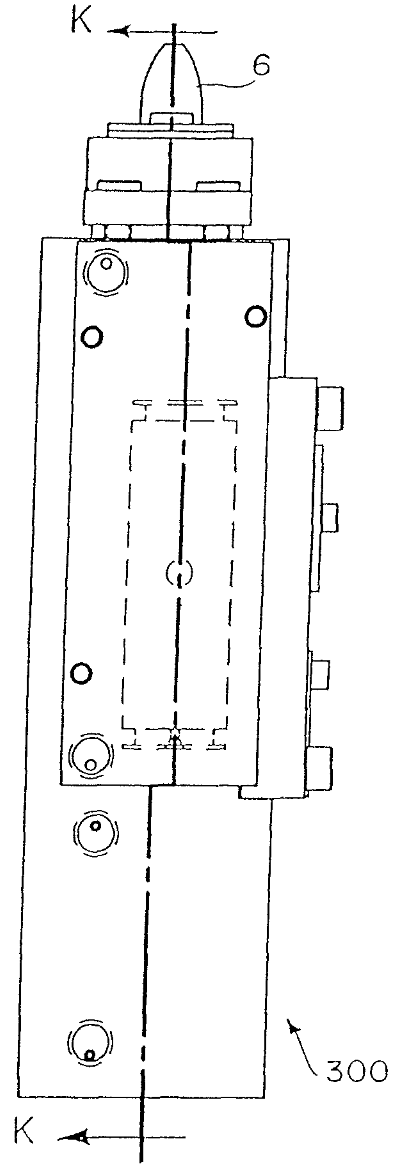
FIGS. 20*a* and *b* are end and side-cross-sectional views of a pin clamp assembly, wherein the sectional view of FIG. 20*b* is taken along lines K-K of FIG. 20*a*.
Figure 20B:
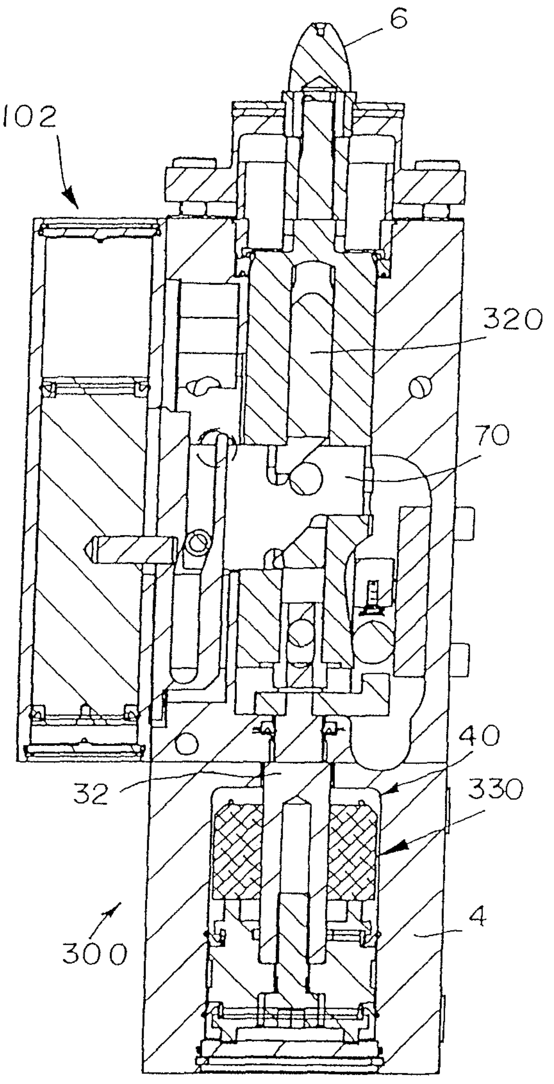

Front and side-cross-sectional views of pin clamp assembly 300 are shown in FIGS. 20*a* and *b*. The cross-sectional view shown in FIG. 20*b* is taken from lines G-G of FIG. 20*a*. In one illustrative embodiment, the movement of locating pin 6 can be adjusted by means of strip-off assembly 102, as described in previous embodiments. The strip-off assembly 102 can also be used to manipulate the movement of fingers 302 similar to that described with respect to fingers 8 in previous embodiments. It is appreciated that other mechanisms can be used to limit the stroke of locating pin 6, if so desired. An example of such is a reducer 330 shown herein that is located adjacent piston 46. As evident from the drawing, reducer 330 effectively limits the stroke or distance of travel available to piston rod 32 and ultimately locating pin 6. Other examples to reduce the stroke of locating pin 6 is possibly use a shorter piston rod in the clamp, or change the configuration of the body, or the bores within the body.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pin clamp assembly comprising:

a movable locating pin;

at least one finger located adjacent the locating pin and movable relative thereto;

a movable drive rod that is engageable with the finger to move the finger between clamped and unclamped positions;

an actuator that moves the locating pin;

a driver that moves laterally relative to the drive rod and locating pin; and a cam member which has a cam slot disposed therein which receives a portion of the driver which restricts movement of the driver;

wherein the locating pin, driver, and drive rod moves separately with respect to each other to move the finger between clamped and unclamped positions.

2. The pin clamp assembly of claim 1, wherein the driver is movable rectilinearly and laterally with respect to the locating pin.

3. The pin clamp assembly of claim 1, wherein the driver moves linearly to move the drive rod so the drive rod moves independently of the locating pin.

4. The pin clamp assembly of claim 1, wherein neither the finger nor the drive rod rotates about a central axis to move the finger between clamped and unclamped positions.

* * * * *